US012606445B2

(12) United States Patent
Kim et al.

(10) Patent No.: US 12,606,445 B2
(45) Date of Patent: Apr. 21, 2026

(54) AEROGEL COMPOSITE

(71) Applicant: LG Chem, Ltd., Seoul (KR)

(72) Inventors: Mi Ri Kim, Daejeon (KR); Kyung Inn Kim, Daejeon (KR); Minhwa Shin, Daejeon (KR); Kyoungshil Oh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/909,415

(22) Filed: Oct. 8, 2024

(65) Prior Publication Data

US 2025/0304453 A1      Oct. 2, 2025

(30) Foreign Application Priority Data

Mar. 27, 2024      (KR) ........................ 10-2024-0042132

(51) Int. Cl.
*C01B 33/158* (2006.01)

(52) U.S. Cl.
CPC ...... *C01B 33/1585* (2013.01); *C01P 2004/10* (2013.01); *C01P 2006/10* (2013.01); *C01P 2006/32* (2013.01); *C01P 2006/90* (2013.01)

(58) Field of Classification Search
CPC ............. C01B 33/1585; C01P 2004/10; C01P 2006/10; C01P 2006/32; C01P 2006/90
See application file for complete search history.

(56) References Cited

U.S. PATENT DOCUMENTS 2,734,827 A      2/1956   Hooks
7,560,062 B2     7/2009   Gould et al.

10,759,666  B2      9/2020   Hindelang et al.
11,577,490  B2      2/2023   Oikawa et al.
2002/0094426  A1    7/2002   Stepanian et al.
(Continued)

FOREIGN PATENT DOCUMENTS

CN          101680128  B      1/2013
CN          107140938  A      9/2017
(Continued)

OTHER PUBLICATIONS

Woignier et al. (Mechanical Properties of Gel-Derived Materials, Journal of Sol-Gel Science and Technology, 2000) (Year: 2000).*
(Continued)

*Primary Examiner* — Sally A Merkling
*Assistant Examiner* — Logan Laclair
(74) *Attorney, Agent, or Firm* — Lerner David LLP

(57)          ABSTRACT

The present disclosure relates to an aerogel composite and an insulation member including the same, wherein the aerogel composite may maintain insulation constant without significant degradation even when exposed to a pressurization environment. The aerogel composite includes a substrate including a plurality of discrete fibers and voids between the fibers; and silica aerogel including a plurality of aerogel particles positioned on the fiber and in the voids between the fibers, and having a network structure including one or more pores, wherein when a pressure of 150 N/cm$^2$ is applied in a thickness direction with respect to the aerogel composite, a volume ratio of aerogel including pores and voids between discrete fibers per unit volume of the aerogel composite is 0.85 times to 1 time compared to before the pressure was applied.

11 Claims, 2 Drawing Sheets

(56) References Cited

U.S. PATENT DOCUMENTS

| | | | |
|---|---|---|---|
| 2006/0125158 A1 | 6/2006 | Rouanet et al. | |
| 2010/0143717 A1 | 6/2010 | Sakamoto et al. | |
| 2016/0032584 A1 | 2/2016 | Doshi et al. | |
| 2016/0369059 A1 | 12/2016 | Kotake et al. | |
| 2017/0210092 A1 | 7/2017 | Rikleen et al. | |
| 2017/0283269 A1 | 10/2017 | Kotake et al. | |
| 2018/0009969 A1 | 1/2018 | Kim et al. | |
| 2018/0010726 A1 | 1/2018 | Kim et al. | |
| 2018/0029892 A1 | 2/2018 | Yu et al. | |
| 2018/0086587 A1 | 3/2018 | Kim et al. | |
| 2018/0134566 A1 | 5/2018 | Kim et al. | |
| 2018/0244029 A1 | 8/2018 | Kim et al. | |
| 2018/0313001 A1 | 11/2018 | Dempsey | |
| 2018/0326700 A1 | 11/2018 | Kim | |
| 2019/0062167 A1 | 2/2019 | Kim et al. | |
| 2019/0374921 A1 | 12/2019 | Mihalcik et al. | |
| 2020/0108583 A1 | 4/2020 | Oikawa et al. | |
| 2020/0215791 A1 | 7/2020 | Oh et al. | |
| 2020/0378058 A1 | 12/2020 | Oikawa et al. | |
| 2021/0016239 A1 | 1/2021 | Kim et al. | |
| 2021/0155486 A1* | 5/2021 | Kang | C01B 33/152 |
| 2021/0163303 A1 | 6/2021 | Evans et al. | |
| 2021/0309527 A1 | 10/2021 | Evans et al. | |
| 2021/0363699 A1 | 11/2021 | Afshari et al. | |
| 2021/0370636 A1 | 12/2021 | Tsuruta et al. | |
| 2022/0098046 A1 | 3/2022 | Lee et al. | |
| 2022/0195137 A1 | 6/2022 | Movahhed et al. | |
| 2022/0204350 A1* | 6/2022 | Oh | C01B 33/155 |
| 2022/0380222 A1 | 12/2022 | Kim et al. | |
| 2023/0050685 A1 | 2/2023 | Kim et al. | |
| 2023/0331560 A1 | 10/2023 | Kim et al. | |
| 2023/0348285 A1 | 11/2023 | Numrich et al. | |

FOREIGN PATENT DOCUMENTS

| | | | |
|---|---|---|---|
| CN | 106565268 B | 1/2020 | |
| CN | 113939942 A | 1/2022 | |
| CN | 115748088 A | 3/2023 | |
| CN | 116154360 A | 5/2023 | |
| CN | 116945715 A | 10/2023 | |
| EP | 4056539 A1 | 9/2022 | |
| JP | WO2017221687 A1 | 1/2019 | |
| JP | WO2018163354 A1 | 12/2019 | |
| JP | 2020060291 A | 4/2020 | |
| JP | 2021036038 A | 3/2021 | |
| JP | 2022529347 A | 6/2022 | |
| JP | 7285085 B2 | 6/2023 | |
| JP | 7352769 B2 | 9/2023 | |
| JP | 7368327 B2 | 10/2023 | |
| KR | 20050022986 A | 3/2005 | |
| KR | 20070100738 A | 10/2007 | |
| KR | 100909732 B1 | 7/2009 | |
| KR | 20090078357 A | 7/2009 | |
| KR | 100955622 B1 | 5/2010 | |
| KR | 20120116944 A | 10/2012 | |
| KR | 101281689 B1 | 7/2013 | |
| KR | 20130138275 A | 12/2013 | |
| KR | 20150090320 A | 8/2015 | |
| KR | 20160100082 A | 8/2016 | |
| KR | 101654795 B1 | 9/2016 | |
| KR | 20160125956 A | 11/2016 | |
| KR | 20170060027 A | 5/2017 | |
| KR | 101748532 B1 | 6/2017 | |
| KR | 101752091 B1 | 6/2017 | |
| KR | 20170098141 A | 8/2017 | |
| KR | 20170104914 A | 9/2017 | |
| KR | 20170132829 A | 12/2017 | |
| KR | 20180033064 A | 4/2018 | |
| KR | 101911188 B1 | 10/2018 | |
| KR | 101928538 B1 | 12/2018 | |
| KR | 101966406 B1 | 4/2019 | |
| KR | 101993643 B1 | 6/2019 | |
| KR | 102023531 B1 | 9/2019 | |
| KR | 20200073730 A | 6/2020 | |
| KR | 20200095323 A | 8/2020 | |
| KR | 102192354 B1 | 12/2020 | |
| KR | 20210038374 A | 4/2021 | |
| KR | 20210071508 A | 6/2021 | |
| KR | 20210146798 A | 12/2021 | |
| KR | 20210157353 A | 12/2021 | |
| KR | 20220049841 A | 4/2022 | |
| KR | 20220109454 A | 8/2022 | |
| KR | 20220137360 A | 10/2022 | |
| KR | 20220154727 A | 11/2022 | |
| KR | 20220164499 A | 12/2022 | |
| KR | 20230005300 A | 1/2023 | |
| WO | 2008051029 A1 | 5/2008 | |
| WO | 2017155311 A1 | 9/2017 | |

OTHER PUBLICATIONS

Emmerling, A. et al., "Small angle scattering and the structure of aeroels," Journal of Non-Crystalline Solids, Elsevier B.V., 1992, vol. 145, pp. 113-120.

Dai, Y et al., "A Theoretical Model for the Effective Thermal Conductivity of Silica Aerogel Composites," Applied Thermal Engineering, Sep. 2017, vol. 128, pp. 1634-1645.

Zhao, J. et al., "A 3-D numerical heat transfer model for silica aerogels based on the porous secondary nanoparticle aggregate structure," Journal of Non-Crystalline Solids, May 2012, vol. 358, pp. 1287-1297.

Sangbae, J. et al., "Application os Silica Aerogel as an Interlayer Insulating Film," The Korean Ceramic Society, Ceramist, Dec. 2001, vol. 4, Issue 6, pp. 84-90.

Klochkov, A. et al., "Pulse NMR of 3He in Aerogel at temperature 1.5K," Journal of Physics, Conference Series, IOP Publishing Ltd, 150, 2009, 5 pages.

Shafi. Superhydrophobic, enhanced strength and thermal insulation silica aerogel/glass fber felt based on methyltrimethoxysilane precursor and silica gel impregnation. Journal of Porous Materials, Springer, Dec. 2019, pp. 495-502.

Lakatos. Experimental verification of thermal properties of the aerogel blanket. Case Studies in Thermal Engineering Elsevier Ltd, Mar. 2021, pp. 1-17.

International Search Report for Application No. PCT/KR2024/013053 mailed Dec. 19, 2024, 3 pages. [See p. 1, categorizing the cited references].

International Search Report for Application No. PCT/KR2024/015088 mailed Jan. 16, 2025. 3 pages. (see p. 2-3, categorizing the cited references).

International Search Report for Application No., PCT/KR2025/003927 dated Jun. 30, 2025. 5 pages.

International Search Report for Application No., PCT/KR2025/003925 dated Jun. 30, 2025. 5 pages.

International Search Report for Application No. PCT/KR2025/006641 mailed Aug. 29, 2025. 6 pages.

Ok, S. et al., "Fluid Behavior in Nanoporous Silica" Frontiers in Chemistry, Aug. 2020, pp. 1-20, vol. 8. Article 734.

* cited by examiner

AEROGEL COMPOSITE

CROSS-REFERENCE TO RELATED APPLICATION

This application claims priority to Korean Patent Application No. 10-2024-0042132 filed on Mar. 27, 2024, the content of which is incorporated by reference in its entirety.

BACKGROUND

The present disclosure relates to an aerogel composite and the application use thereof as a heat insulation material.

Aerogel is a super-porous, high specific surface area ($\geq$500 m²/g) material having a porosity of approximately 90.0% to 99.9% and a pore size in the range of 1 nm to 100 nm, and is a material having excellent properties ultra-light weight/super-heat insulation/ultra-low dielectric, and the like. Accordingly, research on the development of aerogel materials as well as research on the application use thereof as transparent heat insulation materials and environmentally friendly high-temperature heat insulation materials, ultra-low dielectric thin films for highly integrated devices, catalysts and catalyst carriers, electrodes for supercapacitors, and electrode materials for seawater desalination have been actively conducted.

The biggest advantage of an aerogel is that it has super-insulation properties exhibiting thermal conductivity of 0.300 W/m. K or less, which is lower than that of an organic heat insulation material such as conventional Styrofoam.

In general, the aerogel is prepared by preparing hydrogel from a silica precursor such as water glass and an alkoxysilane group (TEOS, TMOS, MTMS, and the like) and removing a liquid component inside the hydrogel without destroying the microstructure.

Particularly, a hydrophobic silica aerogel blanket in which hydrophobic silica aerogel is formed in a fiber is a functional heat insulation material which prevents corrosion by moisture, and is widely used in construction or industrial fields, and in addition, the hydrophobic silica aerogel blanket may be usefully used as a heat insulation material or a thermal insulation material for aircraft, ships, automobiles, batteries, and the like. However, when the silica aerogel blanket is applied for the above uses, there have been problems in that when a pressurization environment is provided due to continuous thermal expansion of a device positioned adjacent thereto, or when a large pressure is applied from the surroundings during the installation of an aerogel heat insulation material, the aerogel structure collapses, so that the heat insulation properties are significantly reduced.

SUMMARY

The present disclosure provides an aerogel composite capable of maintaining constant heat insulation properties without significant degradation even when exposed to a pressurization environment.

However, the technical task to be achieved by the present disclosure is not limited to the aforementioned task, and other tasks that are not mentioned will be clearly understood by those skilled in the art from the following description.

In accordance with an aspect of the present disclosure, an aerogel composite includes a substrate including a plurality of discrete fibers and voids between the fibers, and silica aerogel including a plurality of aerogel particles positioned on the fiber and in the voids between the fibers, and having a network structure including one or more pores, wherein when a pressure of 150 N/cm² is applied in a thickness direction with respect to the aerogel composite, the volume ratio of aerogel including pores and voids between discrete fibers per unit volume of the aerogel composite is 0.85 times to 1 time compared to before the pressure was applied.

The volume ratio of the aerogel including pores and the voids between discrete fibers per unit volume of the aerogel composite may be 88% to 98%.

The total volume ratio of the fibers per unit volume of the aerogel composite may be 2% to 12%.

When a pressure of 300 N/cm² is applied in a thickness direction with respect to the aerogel composite, the volume ratio of aerogel including pores and the voids between discrete fibers per unit volume of the aerogel composite may be 0.80 times to 1 time compared to before the pressure was applied.

When a pressure of 300 N/cm² is applied in the thickness direction with respect to the aerogel composite, the volume ratio of aerogel including pores and the voids between discrete fibers per unit volume of the aerogel composite may be 0.89 times to 1 time the volume ratio thereof when a pressure of 150 N/cm² is applied.

When a pressure of 150 N/cm² to 300 N/cm² is applied in the thickness direction of the aerogel composite, the heat transmission coefficient after the compression may be 2 times or less the heat transmission coefficient before the compression.

When a pressure of 150 N/cm² is applied to a cross-section of the aerogel composite, the heat transmission coefficient after the compression may be 1.8 times or less, or greater than 1 time and less than or equal to 1.5 times the heat transmission coefficient before the compression.

When a pressure of 300 N/cm² is applied to a cross-section of the aerogel composite, the heat transmission coefficient after the compression may be 2 times or less, or greater than 1 time and less than or equal to 1.8 times the heat transmission coefficient before the compression.

When a pressure of 150 N/cm² and a pressure of 300 N/cm² are applied to the cross-section of the aerogel composite, the heat transmission coefficient after the compression may be greater than 1 time and less than or equal to 2 times the heat transmission coefficient before the compression.

When a pressure of 150 N/cm² and a pressure of 300 N/cm² are applied to the aerogel composite to compress the same, the heat transmission coefficient before and after the compression may satisfy Equation 2 below.

$$\{(\text{Heat transmission coefficient } (a) \text{ before} \qquad \text{[Equation 2]}$$
$$\text{and after compression} - \text{Average value } (b) \text{ of heat}$$
$$\text{transmission coefficients before and after compression)}\} =$$
$$(\text{Average value } (b) \text{ of heat transmission}$$
$$\text{coefficients before and after compression}) \times A$$

In Equation 2 above, the heat transmission coefficient (a) before and after compression may refer to a heat transmission coefficient obtained after compression with an intensity of 0 N/cm², 150 N/cm², or 300 N/cm² in the thickness direction of the aerogel composite, the average value (b) of heat transmission coefficients before and after compression may refer to an average value of the heat transmission coefficient of an unpressurized aerogel composite and heat transmission coefficients obtained after compressing the aerogel composite with an intensity of each of 150 N/cm$^2$ and 300 N/cm$^2$, and the A may be a real number of −0.30 to +0.30, or a real number of −0.25 to +0.25.

When a pressure of 150 N/cm$^2$ or 300 N/cm$^2$ is applied with respect to the aerogel composite, a rate of change (B) in heat transmission coefficient after compression per unit applied pressure obtained after the compression may satisfy Equation 3 below.

$$B = |(\text{heat transmission coefficient after compression} \quad \text{[Equation 3]}$$
$$\text{with a pressure of } x - \text{heat transmission coefficient}$$
$$\text{after compression with a pressure of } y)/(x - y)|$$

In Equation 3 above, x may be a pressure intensity of 150 N/cm$^2$ or 300 N/cm$^2$, y may be 0, and the B may be a real number of 0 to $2.0×10^{-2}$.

The x may be 150 N/cm$^2$, y may be 0, and the B may be a real number of 0 to $1.5×10^{-2}$.

The x may be 300 N/cm$^2$, y may be 0, and the B may be a real number of 0 to $1.0×10^{-2}$.

The fiber substrate and the aerogel in the aerogel composite may be included at a weight ratio of 1:0.4 to 2.

The density of the aerogel composite may be 0.15 g/cm$^3$ to 0.35 g/cm$^3$.

In accordance with an aspect of the present disclosure, a heat insulation member includes the aerogel composite of the present disclosure.

The heat insulation member may further include a support member positioned on at least one surface of an upper surface of the aerogel composite and a lower surface thereof.

BRIEF DESCRIPTION OF THE DRAWINGS

Aspects of the present disclosure can be understood in more detail from the following description taken in conjunction with the accompanying drawings, in which.

DETAILED DESCRIPTION

Figure 1:
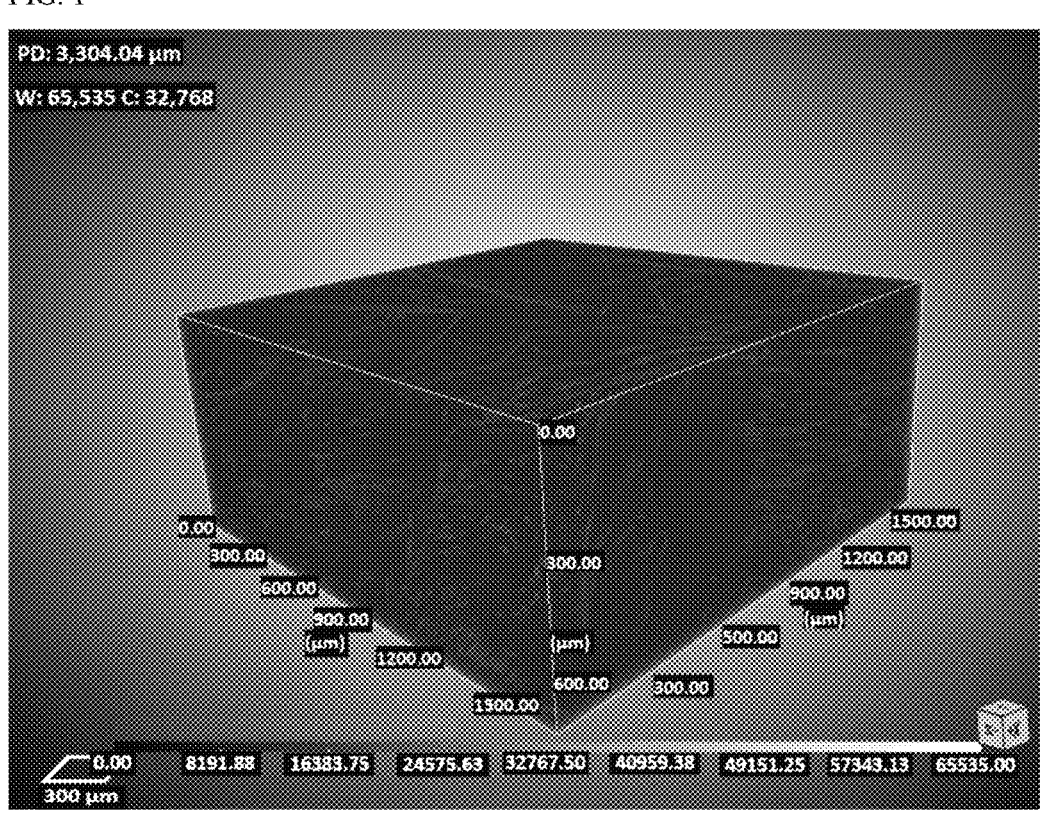
FIG. 1 illustrates an example process of performing in-situ XRM analysis on an aerogel composite in Experimental Example 1, and then setting and extracting a segmentation region for analyzing a volume occupancy ratio of fibers in the aerogel composite and the remaining portion thereof other than the fibers using Dragonfly software.

Hereinafter, the present disclosure will be described in more detail to facilitate understanding of the present disclosure. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In accordance with some aspects of the present disclosure, an aerogel composite includes a fiber substrate, and aerogel including one or more pores.

In the present disclosure, an "aerogel" includes a plurality of primary aerogel particles having a size of greater than approximately 0 nm and less than or equal to 10 nm, or greater than 0 nm and less than or equal to 5 nm, and a secondary aerogel particle formed by aggregation or combination of the above-described primary aerogel particles, and since a plurality of open pores are formed between the above-described primary aerogel particles and between the secondary aerogel particles to form an aggregate, the aerogel forms a three-dimensional network structure.

In the present disclosure, an aerogel may be inorganic silica aerogel formed from a silicon alkoxide-based compound or water glass as a precursor. The aerogel may be composed of silica, methylsilylated silica, dimethylsilylated silica, trimethylsilylated silica, or a mixture thereof. As another example, the aerogel may be that at least a portion of $SiO_2$ present on the surface and/or inside pores of a $SiO_2$ network structure has a bonding structure of $Si—O—SiO_2$ $(CH_3)$, $Si—O—SiO(CH_3)_2$, or $Si—O—Si(CH_3)_3$. A specific process for preparing silica aerogel will be described in detail below.

In the present disclosure, aerogel particles may be positioned on the fiber substrate, and in voids between neighboring fiber substrates. In the present disclosure, the "aerogel particles" are particles in the form of individual solid units constituting aerogel, and may include both primary aerogel particles having a size of greater than approximately 0 nm and less than or equal to approximately 5 nm, preferably having a size of approximately 1 nm, and secondary aerogel particles formed by aggregation of the above-described particles. However, aerogel in an aerogel composite is mostly in the form of secondary aerogel particles or in the form in which the secondary aerogel particles are aggregated and combined, and there may be trace mixtures of primary aerogel particles that do not form secondary aerogel particles. The secondary aerogel particles may have an average particle diameter of approximately 5 nm to 2,000 nm, 5 nm to 1,000 nm, 5 nm to 500 nm, 5 nm to 100 nm, or 5 nm to 50 nm, but are not limited thereto. In the present disclosure, the above-described average particle size may be measured by any method known to those skilled in the art, such as scanning electron microscopy, dynamic light scattering, optical microscopy, or size exclusion, but the method is not limited thereto.

In the present disclosure, the aerogel may have a skeletal structure including mesopores, and may include micropores or macropores in addition to the mesopores. Here, the "mesopore" is a pore having an average pore diameter in the range of approximately 2 nm to approximately 50 nm, the "macropore" is a pore having an average pore diameter in the range of greater than approximately 50 nm, and the "micropore" is a pore having an average pore diameter in the range of less than approximately 2 nm. In the present disclosure, the aerogel may include mesopores of at least 50%, at least 60%, at least 70%, at least 80%, at least 90%, at least 95%, at least 96%, at least 97%, at least 98%, at least 99%, or 100% of the pore volume of the skeletal structure. In some aspects, the aerogel of the present disclosure may include mesopores. In some aspects, the aerogel of the present disclosure may include mesopores and micropores. In the present disclosure, the pore size may be measured by any means known to those skilled in the art, such as a gas adsorption experiment, mercury infiltration, capillary flow porometry, positron annihilation lifetime spectroscopy (PALS), or the like, but is not limited thereto.

In the present disclosure, the porosity of the aerogel may be 80% or greater, 85% or greater, 88% or greater, 89% or greater, 90% or greater, 91% or greater, 92% or greater, 93% or greater, 94% or greater, 95% or greater, 96% or greater, 97% or greater, 98% or greater, or 99% or greater, preferably 80% or greater, or 99.9% or less, but is not limited thereto.

The aerogel composite of the present disclosure has a structure in which at least some of a plurality of aerogel particles are dispersed, preferably combined, on the surface of a substrate including fibers, and at the same time, has a structure in which at least some of the plurality of aerogel particles are dispersed, preferably positioned, in an empty space between discrete fibers in the substrate. In the present disclosure, examples of the above substrate may be discrete fibers, a film, a sheet, a net, a fiber, a porous body, a foam, a non-woven body, or a laminate of two or more layers thereof. In addition, depending on the application thereof, the substrate may have surface roughness formed or patterned on the surface thereof.

In the present disclosure, the fiber substrate may be polyester, polyolefin terephthalate, poly(ethylene) naphthalate, polycarbonate (e.g., rayon, nylon), cotton (e.g., Lycra® manufactured by DuPont), carbon (e.g., graphite), polyacrylonitrile (PAN), oxidized PAN, non-carbonized heat-treated PAN (such as those made of SGL carbon), a glass fiber-based material (S-glass, 901 glass, 902 glass, 475 glass, E-glass, etc.), a silica-based fiber such as Quartz (e.g., Quartzel® manufactured by Saint-Gobain), Q-Fiber® felt (manufactured by Jones Manville), Saffil (manufactured by Saffil), Durablanket (manufactured by Unifrax) and other silica fibers, Duraback® (manufactured by Carborundum), a polyaramid fiber such as Kevlar®, Nomex®, and Sontera® (all manufactured by DuPont), CONEX (manufactured by Taijin), a polyolefin such as Tyvek® (manufactured by DuPont), Dyneema (manufactured by DSM), Spectra® (manufactured by Honeywell), other polypropylene fibers such as Typar® and Xavan® (both manufactured by DuPont), a fluoropolymer such as PTFE under the trade name Teflon® (manufactured by DuPont), Goretex® (manufactured by W. L. GORE), a silicon carbide fiber such as NICALCON (manufactured by COI Ceramics), a ceramic fiber such as NEXTEL (manufactured by 3M), a ceramic paper, an acrylic polymer, wool, silk, hemp, leather, a suede fiber, a PBO fiber Zylong® (manufactured by Toyobo), a liquid crystal material such as VECTAN (manufactured by Hoechst), a cambrel fiber (manufactured by DuPont), polyurethane, polyamide, a wool fiber, a basalt fiber, boron, aluminum, iron, a stainless steel fiber and other thermoplastic resins such as PEEK, PES, PET, PEK, PPS, and the like, but any fiber may be used without limitation as long as it is a fiber which includes spaces or voids into which an aerogel may be easily inserted, thereby improving heat insulation performance. In some aspects, in the present disclosure, the fiber substrate may include a glass fiber. In some aspects, in the present disclosure, the fiber substrate may be made of a glass fiber, but is not limited thereto. In some aspects, in the present disclosure, the fiber substrate may be a glass fiber mat, but is not limited thereto.

In the present disclosure, the thickness of the fiber substrate may be 0.1 nm to 20 mm, but is not limited thereto.

The aerogel composite provided in the present disclosure may have a rectangular parallelepiped shape in which a fiber substrate and aerogel may be mixed from an upper surface to a lower surface, but is not limited thereto.

In addition, at least a portion of the upper surface or lower surface, preferably the entire surface of the aerogel composite provided in the present disclosure may have a flat shape. Here, the "flat shape" means that irregularities are not formed by an intentional embossing or coating process. In the present disclosure, by forming the upper and lower surfaces of the aerogel composite to be flat as described above, it is possible to increase the ease of work in stacking a support member such as a sheet on the surface of the upper and lower surfaces in the future, and increase the adhesion retention rate of the support member. In addition, even if the aerogel composite itself is directly applied as a heat insulation member without a support member, it is preferable in terms of reducing frictional force with the surface of a device positioned adjacent thereto.

In the present disclosure, the thickness of the aerogel composite may be 0.05 mm to 20 mm, for example, 0.1 mm to 15 mm, 0.1 mm to 10 mm, or 0.1 mm to 5 mm, but is not limited thereto.

In the present disclosure, the density of the aerogel composite may be 0.05 g/cm$^3$ to 0.50 g/cm$^3$, 0.05 g/cm$^3$ to 0.35 g/cm$^3$, 0.05 g/cm$^3$ to 0.30 g/cm$^3$, 0.10 g/cm$^3$ to 0.35 g/cm$^3$, 0.10 g/cm$^3$ to 0.30 g/cm$^3$, 0.15 g/cm$^3$ to 0.35 g/cm$^3$, or 0.15 g/cm$^3$ to 0.30 g/cm$^3$, but is not limited thereto.

The heat insulation effect of the aerogel composite is obtained by blocking transmitted heat due to poor convection of air trapped inside the pores included in the aerogel or the voids between the discrete fibers. Therefore, in order to confirm the heat insulation properties of the aerogel composite after pressurization, it is preferable to confirm the change in three-dimensional volume ratio of the voids between fibers and aerogel including the pores, which contribute to the heat insulation effect in the aerogel composite before and after the compression, and the fibers. The change in the thickness of the aerogel composite before and after the compression also reflects the compressibility of the fibers, so that it is difficult to say that the change accurately reflects the change in the heat insulation properties of the aerogel composite. In the present disclosure, the change in the volume ratio of the aerogel including pores and the voids between fibers was confirmed after compressing the aerogel composite with a pressure of 150 N/cm$^2$ or greater, and the change in the heat transmission coefficient was confirmed, and as a result, it has been confirmed that the aerogel composite of the present disclosure has excellent strength of an aerogel mesh structure including the voids and the pores, and thus, even when compressed with a high pressure of 150 N/cm$^2$ or greater, the volume change is small, and accordingly, there is no significant degradation in the level of the heat insulation after the compression.

Specifically, the volume ratio of the remaining portion other than fibers per unit volume of the aerogel composite of the present disclosure, i.e., the voids between fibers and the aerogel including the pores, may be 85% or greater, 86% or greater, 87% or greater, 88% or greater, 89% or greater, or 90% or greater, and 98% or less, 97% or less, 96% or less, 95% or less, 94% or less, or 93% or less, and preferably, may be 88% to 98%, or 90% to 95%. In the present specification, the void refers to an empty space between the discrete fibers, a region which is not filled by the aerogel.

The volume ratio of the fibers per unit volume of the aerogel composite of the present disclosure may be 2% or greater, 3% or greater, 4% or greater, 5% or greater, 6% or greater, 7% or greater, 8% or greater, 9% or greater, or 10% or greater, and 15% or less, 14% or less, 13% or less, 12% or less, 11% or less, or 10% or less, and preferably, may be 2% to 12%, or 5% to 10%.

However, here, the unit volume of the aerogel composite refers to the volume of an aerogel composite in a rectangular parallelepiped shape with a width X length of 1 cm×1 cm. The unit volume of the aerogel composite is defined as the product of the width, length, and height (thickness) of the aerogel composite, assuming that any pores within the aerogel or voids between the discrete fibers, where aerogel particles do not fill, are occupied by an arbitrary material. The volume of fibers per unit volume of the aerogel composite refers to the total volume occupied by the individual fibers within the unit volume of the aerogel composite. The volume of the remaining portion excluding the fibers, per unit volume of the aerogel composite, includes the volumes of the aerogel containing pores and the voids between the discrete fibers, where the aerogel particles are not occupied. The volume of the pores and voids can be calculated by assuming that these pores and voids are evenly filled with an arbitrary material. The total volume of the aerogel containing pores and the voids between the fibers per unit volume of the aerogel composite can be calculated by subtracting the volume of the fibers from the unit volume of the aerogel composite.

In addition, the aerogel composite of the present disclosure may include the aerogel by 0.35 times or more, 0.4 times or more, or 0.45 times or more based on the weight of the fiber substrate, and for example, may include the fiber substrate and the aerogel at a weight ratio of 1:0.35 to 2, preferably 1:0.4 to 2, or 1:0.45 to 1.5.

In the present disclosure, when a pressure of 150 N/cm$^2$ is applied in a thickness direction with respect to the aerogel composite, the volume ratio of the aerogel including pores and the voids between fibers per unit volume of the aerogel composite may be 0.85 times or more, 0.86 times or more, 0.87 times or more, 0.88 times or more, 0.89 times or more, 0.90 times or more, 0.91 times or more, 0.92 times or more, 0.93 times or more, 0.94 times or more, or 0.95 times or more, and 1 time or less, 0.99 times or less, 0.98 times or less, 0.97 times or less, 0.96 times or less, 0.95 times or less, 0.94 times or less, 0.93 times or less, 0.92 times or less, 0.91 times or less, or 0.90 times or less, with respect to the volume ratio of the aerogel including voids and pores per unit volume of the aerogel composite before the pressure is applied. Preferably, it may be 0.85 times to 1 time, 0.85 times to 0.97 times, or 0.87 times to 0.97 times.

In the present disclosure, when a pressure of 300 N/cm$^2$ is applied in the thickness direction with respect to the aerogel composite, the volume ratio of the aerogel including pores and the voids between fibers per unit volume of the aerogel composite may be 0.80 times or more, 0.81 times or more, 0.82 times or more, 0.83 times or more, 0.84 times or more, 0.85 times or more, 0.86 times or more, 0.87 times or more, 0.88 times or more, or 0.89 times or more, and 1 time or less, 0.99 times or less, 0.98 times or less, 0.97 times or less, 0.96 times or less, 0.95 times or less, 0.94 times or less, 0.93 times or less, 0.92 times or less, 0.91 times or less, or 0.90 times or less, with respect to the volume ratio of the aerogel including pores and the voids between fibers and per unit volume of the aerogel composite before the pressure is applied. Preferably, it may be 0.80 times to 1 time, 0.80 times to 0.95 times, or 0.85 times to 0.95 times.

In the present disclosure, when a pressure of 300 N/cm$^2$ is applied in the thickness direction with respect to the aerogel composite, the volume ratio of the aerogel including pores and the voids between fibers per unit volume of the aerogel composite may be 0.85 times or more, 0.86 times or more, 0.87 times or more, 0.88 times or more, 0.89 times or more, 0.90 times or more, 0.91 times or more, or 0.92 times or more, and 1 time or less, 0.99 times or less, 0.98 times or less, 0.97 times or less, 0.96 times or less, 0.95 times or less, 0.94 times or less, or 0.93 times or less, with respect to the volume ratio of the aerogel including pores and the voids between fibers per unit volume of the aerogel composite when a pressure of 150 N/cm$^2$ is applied. Preferably, it may be 0.89 times to 1 time, or 0.89 times to 0.99 times.

In the present disclosure, the above-described volume ratio of the aerogel including pores and the voids between fibers per unit volume of the aerogel composite may be obtained by randomly obtaining, from the aerogel composite, a total of five rectangular parallelepiped specimens with a width X length of 1 cm×1 cm and a thickness, which is the thickness of thickness of the aerogel composite, and then calculating an average value of volume ratios of the voids and the aerogel including pores per unit volume of the aerogel composite as measured from each specimen. At this time, the five specimens may be obtained by obtaining four specimens by positioning a position, which is spaced apart by 10 cm in a center direction from each corner of the aerogel composite prepared in a rectangular shape (e.g., which may have a size of 60 cm×12 cm, but is not limited thereto) prepared in a rectangular parallelepiped shape, at the exact center of each specimen, and obtaining one specimen by positioning the exact central portion of the aerogel composite at the exact center of a specimen.

In addition, in the present disclosure, the volume ratio of the aerogel including pores and the voids between fibers per unit volume of the aerogel composite described above may be obtained by using VERSA 520 equipment of ZEISS Co., and by measuring the volume ratio of the fibers and the remaining portion other than the fibers in a segmentation to be analyzed using Dragonfly software (version 2021.3). At this time, the size (width×length×height) of the segmentation to be analyzed is not specifically limited, and the segmentation may be set and extracted to each size or less of the unit volume. In some aspects, the segmentation may be set and extracted to a width×length×height of approximately 1700 μm×1600 μm×500 μm. In order to measure the volume ratio of the aerogel including pores and the voids between fibers per unit volume of the aerogel composite after the compression, pressure may be applied to an aerogel composite specimen by using a load cell of Deben Co., and then the volume ratio may be measured in the same manner. However, in the present specification, the above-described method is merely described as an example of a method for measuring the aerogel including pores and the voids between fibers per unit volume of the aerogel composite described above, and the method is not limited to the above-described method.

The aerogel composite provided in the present disclosure does not have a significant change in the volume of the aerogel including pores and the voids after pressurization, and accordingly, does not have a significant change in the thermal conductivity, so that the rate of increase in the heat transmission coefficient is not high compared to that before the pressurization. As such, the aerogel composite provided in the present disclosure may maintain the heat insulation performance at an excellent level without significant degradation due to pressurization.

Specifically, in the present disclosure, when a pressure of 150 N/cm$^2$ to 300 N/cm$^2$ is applied to the aerogel composite in the thickness direction, the heat transmission coefficient after the compression may be 2 times or less, 1.9 times or less, 1.8 times or less, 1.7 times or less, 1.6 times or less, 1.5 times or less, 1.4 times or less, or 1.3 times or less, and additionally, may be 1 time or more, or greater than 1 time the heat transmission coefficient before the compression.

In the present disclosure, in applying the pressure, the "thickness direction" of the aerogel composite refers to a horizontal direction (transverse direction) with respect to a cross-section of the aerogel composite, and more specifically, may refer to a direction from an upper surface of the aerogel composite to a lower surface thereof, or a direction from the lower surface to the upper surface.

In the present disclosure, the "heat transmission coefficient" refers to the transfer of heat from an air layer to an air layer through a solid object, and means the amount of heat flowing when a cross-sectional area of 1 m$^2$ is at a temperature difference of 1° C. per unit time, which is a value obtained by dividing the thermal conductivity of an object the thickness of the object. The amount of heat transfer of an object is affected by the thermal conductivity and thickness of the object, and the greater the thermal conductivity and the thinner the thickness, the greater the amount of heat transfer. Therefore, in order to achieve good heat insulation performance, the thermal conductivity is required to be small and the thickness is required to be large. However, when a pressure is applied to an elastic object, such as an aerogel composite, the thermal conductivity may change after the pressurization, and the thickness may also change. That is, unless the object is a completely elastic material, the thickness thereof inevitably decreases after the pressurization, but if the thermal conductivity does not change, the total amount of heat transfer increases due to the thickness reduction. That is, it is inevitable that the heat insulation performance will be degraded. Therefore, whether the heat insulation performance is maintained after the pressurization is not confirmed only with the thermal conductivity after the pressurization, but confirmed with the heat transmission coefficient, which considers both the thermal conductivity after pressurization and the thickness after pressurization. Even if the thermal conductivity decreases or is maintained after pressurization, if the thickness is significantly reduced after the pressurization, the heat transmission coefficient and the total amount of heat transfer inevitably increase significantly.

In the present disclosure, the value of "pressure" applied for measuring the heat transmission coefficient after the compression refers to the value of pressure actually applied with respect to the unit area of the aerogel composite, when pressure is applied in the thickness direction of the aerogel composite using a press machine or the like. For example, when a pressure is applied in the horizontal direction (transverse direction) with respect to the cross-section of the aerogel composite using a press device including a cylinder, the actual pressure value may mean, as shown in Equation 1 below, a value obtained by dividing the product of a cross-sectional area of the cylinder and a set pressure value by the area of a specimen, but is not limited thereto, and may be calculated differently depending on each device or as set by a manufacturer.

$$
\begin{aligned}
\text{Actual pressure value} = \qquad\qquad\qquad\qquad & \text{[Equation 1]}\\
(\text{Radius of inner diameter of cylinder of press} \\
\text{equipment (cm)} \times \text{Radius of inner diameter of cylinder} \\
\text{of press equipment (cm)} \times 3.14 \times \text{set pressure value})/ \\
(\text{Area of speciment (cm}^2))
\end{aligned}
$$

In the present disclosure, the "heat transmission coefficient after compression" refers to a ratio of thermal conductivity to a cross-sectional thickness of the aerogel composite measured after a predetermined time has elapsed after compression by applying a specific level of pressure to the aerogel composite in the thickness direction. Here, the predetermined time may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 60 minutes or more, 2 hours or more, 4 hours or more, 6 hours or more, 8 hours or more, 10 hours or more, 12 hours or more, 24 hours or more, 48 hours or more, or 96 hours or more, but is not limited thereto. For example, the heat transmission coefficient after compression may be measured 60 minutes (1 hour) after the compression of the aerogel composite.

In the present disclosure, the application time of a pressure with respect to the aerogel composite is not particularly limited, but may be, for example, 1 second or more, 5 seconds or more, 10 seconds or more, 30 seconds or more, 1 minute or more, 5 minutes or more, 10 minutes or more, 20 minutes or more, 30 minutes or more, 40 minutes or more, 50 minutes or more, 1 hour or more, or 2 hours or more, and 24 hours or less, 12 hours or less, 10 hours or less, 8 hours or less, 6 hours or less, 4 hours or less, 2 hours or less, 1 hour or less, 50 minutes or less, 40 minutes or less, 30 minutes or less, 20 minutes or less, 10 minutes or less, 5 minutes or less, 1 minute or less, 30 seconds or less, 10 seconds or less, or 5 seconds or less, but is not limited thereto. For example, the application time of the pressure may be 10 minutes.

In the present disclosure, when a pressure of 150 N/cm$^2$ is applied with respect to the cross-section of the aerogel composite, the heat transmission coefficient after the compression may be 1.8 times or less, 1.7 times or less, 1.6 times or less, 1.5 times or less, 1.4 times or less, 1.3 times or less, or 1.2 times or less, and additionally, may be 1 time or more, or greater than 1 time the heat transmission coefficient before the compression. Preferably, it may be greater than 1 time and less than or equal to 1.7 times, greater than 1 time and less than or equal to 1.5 times, or greater than 1 time and less than or equal to 1.3 times.

In the present disclosure, when a pressure of 300 N/cm$^2$ is applied with respect to the cross-section of the aerogel composite, the heat transmission coefficient after the compression may be 2 times or less, 1.9 times or less, 1.8 times or less, 1.7 times or less, 1.6 times or less, 1.5 times or less, 1.4 times or less, or 1.3 times or less, and additionally, may be 1 time or more, or greater than 1 time the heat transmission coefficient before the compression. Preferably, it may be greater than 1 time and less than or equal to 2 times, greater than 1 time and less than or equal to 1.7 times, or greater than 1 time and less than or equal to 1.5 times.

In the present disclosure, when a pressure of 150 N/cm$^2$ and 300 N/cm$^2$ are applied with respect to the cross-section of the aerogel composite, the heat transmission coefficient after the compression may be 2 times or less, 1.9 times or less, 1.8 times or less, 1.7 times or less, 1.6 times or less, 1.5 times or less, 1.4 times or less, or 1.3 times or less, and additionally, may be 1 time or more, or greater than 1 time the heat transmission coefficient before the compression. Preferably, it may be greater than 1 time and less than or equal to 2 times, greater than 1 time and less than or equal to 1.7 times, or greater than 1 time and less than or equal to 1.5 times.

Even when the aerogel composite provided in the present disclosure is pressurized (or compressed) with a pressure of any intensity, the heat transmission coefficient is maintained within a specific range before and after the compression, so that the heat insulation performance may be maintained at an excellent level without significant degradation.

Specifically, the heat transmission coefficient obtained after compressing the aerogel composite of the present disclosure with a pressure of at least one pressure value of 0 N/cm² to 300 N/cm² may satisfy Equation 2 below.

$$\{(\text{Heat transmission coefficient } (a) \text{ before} \qquad [\text{Equation 2}]$$
$$\text{and after compression} - \text{Average value } (b) \text{ of heat}$$
$$\text{transmission coefficients before and after compression})\} =$$
$$(\text{Average value } (b) \text{ of heat transmission}$$
$$\text{coefficients before and after compression}) \times A$$

In Equation 2 above, the "heat transmission coefficient (a) before and after compression" means the heat transmission coefficient obtained after performing compression with a pressure of at least one pressure value in the range of 0 N/cm² to 300 N/cm² in the horizontal direction (transverse direction) with respect to the cross-section of the aerogel composite, and as an example, may mean the heat transmission coefficient obtained after compressing the aerogel composite by applying a pressure of 0 N/cm², 150 N/cm² or 300 N/cm². Here, the pressure of 0 N/cm² means that pressurization is not performed (no compression), and accordingly, the heat transmission coefficient obtained after performing compression by applying a pressure of 0 N/cm² means the heat transmission coefficient of an unpressurized aerogel composite.

In addition, the "average value (b) of heat transmission coefficients before and after compression" means the average value of the heat transmission coefficient of an unpressurized (or uncompressed) aerogel composite, and the heat transmission coefficients obtained after performing compression with a pressure of at least two pressure values in the range of greater than 0 N/cm² and less than or equal to 300 N/cm² in the horizontal direction (transverse direction) with respect to the cross-section of the aerogel composite. In some aspects, the "average value (b) of heat transmission coefficients before and after compression" may mean the average value of the heat transmission coefficient of an unpressurized (uncompressed) aerogel composite, and the heat transmission coefficients obtained after compressing the aerogel composite by applying a pressure of each of 150 N/cm² and 300 N/cm².

The A may be a real number of −0.30 to +0.30, a real number of −0.25 to +0.25, a real number of −0.24 to +0.24, a real number of −0.23 to +0.23, a real number of −0.22 to +0.22, a real number of −0.21 to +0.21, a real number of −0.20 to +0.20, a real number of −0.19 to +0.19, a real number of −0.15 to +0.15, a real number of −0.14 to +0.14, a real number of −0.13 to +0.13, or a real number of −0.12 to +0.12. Preferably, it may be a real number of 0.25 to +0.25, a real number of −0.23 to +0.23, a real number of −0.20 to +0.20, or a real number of −0.15 to +0.15.

In some embodiments, the heat transmission coefficient of an unpressurized, uncompressed (0 N/cm² compression) aerogel composite may satisfy Equation 2 above. At this time, the average value (b) of heat transmission coefficients before and after compression may refer to an average value of the heat transmission coefficient of an unpressurized aerogel composite and heat transmission coefficients obtained after compressing the aerogel composite in the thickness direction with a pressure value of each of 150 N/cm² and 300 N/cm².

In some aspects, the heat transmission coefficient obtained after compressing the aerogel composite with a pressure of 150 N/cm² may satisfy Equation 2 above. At this time, the average value (b) of heat transmission coefficients before and after compression may refer to an average value of the heat transmission coefficient of an unpressurized (0 N/cm² compression) aerogel composite, and heat transmission coefficients obtained after compressing the aerogel composite in the thickness direction with a pressure value of each of 150 N/cm² and 300 N/cm².

The heat transmission coefficient obtained after compressing the aerogel composite with a pressure of 300 N/cm² may satisfy Equation 2 above. At this time, the average value (b) of heat transmission coefficients before and after compression may refer to an average value of the heat transmission coefficient of an unpressurized (0 N/cm² compression) aerogel composite, and heat transmission coefficients obtained after compressing the aerogel composite in the thickness direction with a pressure value of each of 150 N/cm² and 300 N/cm².

In some aspects, the average value (b) of heat transmission coefficients before and after compression may refer to an average value of the heat transmission coefficient of an unpressurized (0 N/cm² compression) aerogel composite, and heat transmission coefficients obtained after compression by applying a pressure of each of 150 N/cm² and 300 N/cm² in the thickness direction of the aerogel composite.

For example, in Equation 2 above, the A may be a real number of −0.30 to +0.30, a real number of −0.25 to +0.25, a real number of −0.23 to +0.23, a real number of −0.20 to +0.20, but is not limited thereto.

In addition, a rate of change (B) in heat transmission coefficient after compression per unit applied pressure obtained after compressing the aerogel composite with any two pressure values of 0 N/cm² to 300 N/cm² may satisfy Equation 3 below.

$$B = |(\text{heat transmission coefficient after compression} \qquad [\text{Equation 3}]$$
$$\text{with a pressure of } x - \text{heat transmission coefficient}$$
$$\text{after compression with a pressure of } y)/(x - y)|$$

In Equation 3 above, x and y are independently any one pressure value (unit N/cm²) in the pressure range of 0 N/cm² to 300 N/cm², and are different pressure values from each other, and the B may be a real number of 0 or greater, 2.0×10⁻² or less, 1.5×10⁻² or less, 1.4×10⁻² or less, 1.3×10⁻² or less, 1.2×10⁻² or less, 1.1×10⁻² or less, 1.0×10⁻² or less, 9.0×10⁻³ or less, 8.0×10⁻³ or less, 7.0×10⁻³ or less, 6.0×10⁻³ or less, or 5.0×10⁻³ or less.

In some aspects, in Equation 3 above, x and y may independently be any one pressure value of 0 N/cm², 150 N/cm², or 300 N/cm².

In some aspects, in Equation 3 above, x may be 150 N/cm², and y may be 0 N/cm². At this time, the B may be a real number of 0 or greater, 2×10⁻² or less, or 1.5×10⁻² or less, but is not limited thereto.

In some aspects, in Equation 3 above, x may be 300 N/cm², and y may be 0 N/cm². At this time, the B may be a real number of 0 or greater, $2\times10^{-2}$ or less, $1.5\times10^{-2}$ or less, or $1.0\times10^{-2}$ or less, but is not limited thereto.

In some aspects, in Equation 3 above, x may be 300 N/cm², and y may be 150 N/cm². At this time, the B may be a real number of 0 or greater, $1.0\times10^{-2}$ or less, or $9.0\times10^{-3}$ or less, but is not limited thereto.

In the present disclosure, in the case of measuring the heat transmission coefficient after compression by using a press device, etc., as described above, it is possible to prepare and measure a single specimen from the aerogel composite, but depending on a measurement device, if the horizontal or vertical size of the aerogel composite is smaller than a part of the measurement device that applies pressure, the aerogel composite is cut into two or more pieces, and then rearranged such that both the horizontal and vertical sizes thereof are to be larger than a pressure applying device before measuring the compression recovery rate or heat transmission coefficient, and the measured value is considered to be substantially the same as that of a single specimen.

In some aspects of the present disclosure, the recovery rate after compression or the heat transmission coefficient after compression may be measured for a rectangular-shaped aerogel composite specimen having a size of 30 cm×24 cm in width×length. At this time, if the width or length of the prepared aerogel composite is smaller than 30 cm or 24 cm, two or more specimens may be disposed next to each other in parallel, and then rearranged such that the size of each of the specimens is to be 30 cm×24 cm, and the measurement may be performed on the specimens.

In the present disclosure, the aerogel composite has a compressive strength of 20 kPa to 80 kPa, 20 kPa to 70 kPa, 30 kPa to 80 kPa, 30 kPa to 70 kPa, 35 kPa to 80 kPa, or 35 kPa to 70 kPa at 10% deformation, and may have excellent mechanical strength. Here, the compressive strength may be measured by preparing a specimen according to the ASTM C165 standard.

In the present disclosure, the aerogel composite has a tensile strength of 30 N/cm² to 60 N/cm², 40 N/cm² to 55 N/cm², or 45 N/cm² to 55 N/cm², and may have excellent flexibility. Here, the tensile strength may be measured by preparing a specimen according to the ASTM D638 standard.

In the present disclosure, the aerogel composite may be generally formed by preparing a silica sol, impregnating a fiber substrate with the silica sol, and then performing gelation thereon, and drying the same. Hereinafter, each step will be described. However, the specific preparation processes or examples thereof described herein are not intended to be limited to any particular type of aerogel or preparation method thereof. The present specification may include any aerogel formed by any associated preparation method known to those skilled in the art.

Preparation of Silica Sol

In the present disclosure, a silica precursor composition and a catalyst composition may be mixed to prepare a silica sol.

In the present disclosure, the silica precursor composition may include water and/or a polar organic solvent in a silica precursor.

In the present disclosure, the silica precursor may be used without limitation as long as it is a precursor which may be used to form a silica aerogel, and for example, may be a silicon-containing alkoxide-based compound. Specifically, the silica precursor may be tetra alkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, more specifically, in the case of the present disclosure, the silica precursor may be tetramethyl orthosilicate (TMOS), tetraethyl orthosilicate (TEOS), or a mixture thereof.

In addition, in the present disclosure, the silica precursor may be a water glass solution. Here, the water glass solution may be a diluted solution in which distilled water is added to water glass and then mixed therewith, and the water glass may be sodium silicate ($Na_2SiO_3$) which is an alkali silicate salt obtained by melting silicon dioxide ($SiO_2$) and alkali.

In addition, in the present disclosure, the silica precursor may include a pre-hydrolyzed TEOS (HTEOS). The HTEOS is an ethyl silicate oligomer material having a wide molecular weight distribution, and when synthesized into an oligomer form from a TEOS monomer, physical properties such as gelation time may be adjusted, and thus, may be easily applied according to a user's reaction conditions. In addition, there is an advantage in that reproducible physical properties of a final product may be created. The HTEOS may typically be synthesized by a condensation reaction of TEOS which has undergone a partial hydration step under acidic conditions. That is, the HTEOS is in the form of an oligomer prepared by condensing TEOS, wherein the oligomer is partially hydrated.

In the present disclosure, the silica precursor composition may further include a silicate containing a hydrophobic group, thereby imparting elasticity to the aerogel structure to increase the pore strength of the aerogel composite. In the present disclosure, the type of the silicate including a hydrophobic group is not limited as long as it is an alkyl silane compound including an alkyl group inducing hydrophobization and a silane functional group capable of reacting with an —Si—O-functional group of a wet gel, but specific examples thereof may include one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES), but are not limited thereto.

In the present disclosure, when the silicate including a hydrophobic group is included in the silica precursor composition, the silicate including a hydrophobic group and the tetraalkyl silicate may be included in a molar ratio (molar ratio of silicate including a hydrophobic group:tetraalkyl silicate) of 2:98 to 98:2. Within the above range, the strength and heat insulation performance of aerogel may be secured with high efficiency, and the structure does not collapse even when the aerogel is compressed with a high pressure, so that degradation in the heat insulation performance may be prevented.

In the present disclosure, the silica concentration of the silica precursor composition may be 10 kg/m³ to 100 kg/m³, 20 kg/m³ to 80 kg/m³, 30 kg/m³ to 70 kg/m³, 30 kg/m³ to 60 kg/m³, or 35 kg/m³ to 45 kg/m³, but is not limited thereto. In the present disclosure, the silica concentration is the concentration of the silica included in the silica precursor with respect to the silica precursor composition, and may be suitably adjusted by varying the contents of a silica precursor, an organic solvent, and water.

In the present disclosure, the silica precursor may be used in an amount such that the content of the silica included in the silica sol is to be 0.1 wt % to 30 wt %, but is not limited thereto. If the content of the silica satisfies the above range, it is preferable in terms of securing mechanical physical properties, flexibility in particular, of the aerogel composite at an excellent level while having an improved heat insulation effect.

In the present disclosure, the polar organic solvent may include an alcohol, and specific examples thereof may include a monohydric alcohol such as methanol, ethanol, isopropanol, and butanol, a polyhydric alcohol such as glycerol, ethylene glycol, propylene glycol, diethylene glycol, dipropylene glycol, and sorbitol, or a combination thereof, but other solvents as known to those skilled in the art may also be used without limitation. In the present disclosure, when considering the miscibility with water and aerogel, the polar organic solvent may be a monohydric alcohol having 1 to 6 carbon atoms such as methanol, ethanol, isopropanol, and butanol, and may be, for example, ethanol.

In the present disclosure, the polar organic solvent may be used in an appropriate amount by those skilled in the art in consideration of the degree of hydrophobicity in an aerogel composite to be finally produced while promoting a surface modification reaction.

In the present disclosure, when preparing the silica precursor composition, the silica precursor and the organic solvent may be mixed at a weight ratio of 1:0.1 to 5, or 1:0.5 to 3 to prepare the composition, the present disclosure is not limited thereto. However, if the silicate containing a hydrophobic group is included in the silica precursor composition, a mixture of the silicate containing a hydrophobic group and a tetraalkyl silicate and an organic solvent may be mixed in the above weight ratio.

In addition, in the present disclosure, when preparing the silica precursor composition, the silica precursor and water may be mixed and in a molar ratio of 1:0.5 to 10, 1:1 to 8, or 1:3 to 6 to prepare the composition, but the present disclosure is not limited thereto. However, if the silicate containing a hydrophobic group is included in the silica precursor composition, a mixture of the silicate containing a hydrophobic group and a tetraalkyl silicate and water may be mixed in the above molar ratio.

In the present disclosure, the silica precursor composition may further include an acid catalyst, and specifically, may further include an acid catalyst when applying an alkoxy silane-based compound, which is not a hydrolysate, as a precursor. At this time, the acid catalyst may be used without limitation as long as it is an acid catalyst which allows the pH to be 3 or less, and as an example, a hydrochloric acid, a nitric acid, a sulfuric acid, a phosphoric acid, an oxalic acid, or an acetic acid may be used. At this time, the acid catalyst may be added in an amount which allows the pH of the sol to be 3 or less, and may be added in the form of an aqueous solution in which the acid catalyst is dissolved in an aqueous solvent.

In the present disclosure, the catalyst composition may include, as a base catalyst, an inorganic base such as sodium hydroxide or potassium hydroxide, or an organic base such as ammonium hydroxide. Specific examples thereof may include sodium hydroxide (NaOH), potassium hydroxide (KOH), calcium hydroxide (Ca(OH)$_2$), ammonia (NH$_3$), ammonium hydroxide (NH$_4$OH; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, pyridine, a combination thereof, or the like, but are not limited thereto.

In the present disclosure, the base catalyst may be included in an amount such that the pH of the sol is to be 5 to 9. If the pH of the sol is out of the above range, gelation may not be easily achieved or a gelation rate may be too low, so that processability may be degraded. In addition, since the base may be precipitated when introduced in a solid phase, it may be preferable that the base is added in a solution phase diluted by an aqueous solvent or the above-described organic solvent. At this time, the dilution ratio of the base catalyst and the organic solvent, specifically an alcohol, may be 1:4 to 1:100 based on a volume basis, but is not limited thereto.

In the present disclosure, in order to prepare the silica sol, the silica precursor composition and the catalyst composition may be mixed at a volume ratio of 1:0.01 to 10.0, 1:0.01 to 5.0, or 1:0.01 to 2.0, but is not limited thereto.

In the present disclosure, if necessary, an additive may be further added to the silica sol. At this time, all known additives which may be added when preparing aerogel may be applied as the additive, and for example, an additive such as an opacifying agent and a flame retardant may be used.

In the present disclosure, the additive may be added in an amount of 0.1 wt % to 10 wt %, 0.1 wt % to 7 wt %, 0.5 wt % to 7 wt %, or 0.5 wt % to 5 wt % based on the silica content of the aerogel, but is not limited thereto.

Gelation of Silica Sol

In the present disclosure, after the silica sol is impregnated into the substrate, the silica sol may be subjected to gelation.

In the present disclosure, the impregnation process is a process of allowing a catalyzed silica sol to permeate into pores inside the substrate, and may be performed by introducing the catalyzed silica sol and the substrate into a reaction vessel, or may be performed by spraying the catalyzed silica sol on the substrate which is moving on a conveyor belt according to a roll-to-roll process. At this time, in order to improve the bonding between the substrate and the silica sol, the substrate may be lightly pressed down to be sufficiently impregnated. Thereafter, the substrate may be pressed to a predetermined thickness with a predetermined pressure to remove excess silica sol, so that drying time may be reduced.

In the present disclosure, the temperature of the silica sol in the reaction vessel may be 1° C. to 40° C., 20° C. to 40° C., 25° C. to 40° C., 30° C. to 40° C., or 35° C. to 45° C. When the temperature of the silica sol in the reaction vessel satisfies the above range, it is preferable in that the above-described viscosity range of the catalyzed sol may be more easily achieved, and even the retention time is relatively short, a desired level of viscosity range may be achieved.

In the present disclosure, the catalyzed silica sol may be impregnated into the substrate at a volume ratio of 0.1 to 10:1 (catalyzed silica sol: substrate), a volume ratio of 0.1 to 1:1, a volume ratio of 0.3 to 1:1, a volume ratio of 0.5 to 1:1, or a volume ratio of 0.6 to 1:1, but is not limited thereto.

In the present disclosure, when preparing the silica sol, the ratio of the silica precursor composition, the organic solvent, and the water may be adjusted, and the volume ratio between the silica sol and the substrate in the impregnation step may be adjusted to adjust the density ratio of the fiber substrate and the aerogel in the aerogel composite. In the present disclosure, it is preferable to allow the density ratio of the fiber substrate and the aerogel to be 1:0.6 to 1 in terms of increasing the strength of the aerogel composite.

In the present disclosure, the silica sol impregnated into the substrate may be subjected to gelation simultaneously with the impregnation process of the silica sol or sequentially after the impregnation process.

In the present disclosure, the substrate impregnated with the catalyzed sol may be subjected to gelation on a moving element such as a conveyor belt.

In the present disclosure, the "gelation" may refer to a sol-gel reaction, and the "sol-gel reaction" may be forming a network structure from a silicon unit precursor material. Here, the network structure may be a planar mesh structure in which specific polygons having one or more types of atomic arrangement are linked to each other, or a structure in which specific polyhedrons share their vertices, edges, faces, and the like with each other to form a three-dimensional skeletal structure.

In the present disclosure, the gelation may be performed under an ambient atmosphere temperature of 20° C. to 40° C., 20° C. to 30° C., 25° C. to 40° C., 30° C. to 40° C., or 35° C. to 40° C., and it is particularly preferable that the gelation is performed under an ambient atmosphere temperature of 30° C. to 40° C. or 35° C. to 40° C. in terms of increasing the strength of pores in the aerogel composite, but the present disclosure is not limited thereto.

In the present disclosure, the gelation may be performed for 1 minute to 120 minutes, 1 minute to 100 minutes, 1 minute to 60 minutes, 5 minutes to 60 minutes, 5 minutes to 40 minutes, 10 minutes to 40 minutes, 10 minutes to 30 minutes, or 10 minutes to 20 minutes, but may be suitably adjusted in consideration the gelation temperature, the amount of silica sol, and the like.

Aging of Wet Gel Composite which has Gelled

In the present disclosure, if necessary, an aging step may be further included, which is leaving the wet gel composite obtained by gelation as described above to stand at an appropriate temperature so as to achieve a complete chemical change. In the aging step, the network structure formed by the gelation may be more firmly formed, so that the mechanical stability of the aerogel composite may be improved.

In the present disclosure, the aging step may be performed by leaving the wet gel composite which has gelled to stand as it is at an appropriate temperature, or may be performed by adding a cross-linking-promoting compound.

In the present disclosure, the aging step may be performed by adding a solution in which a base catalyst such as sodium hydroxide (NaOH), potassium hydroxide (KOH), ammonium hydroxide ($NH_4OH$), triethylamine, pyridine, or the like is diluted to a concentration of 1% to 10% in an organic solvent, in the presence of the wet gel composite. In this case, a Si—O—Si bonding in aerogel is induced to the maximum to allow the network structure of a silica gel to be firmer, so that there is an effect of facilitating the maintenance of the pore structure in a drying process be performed later. At this time, the organic solvent may be the alcohol described above, and specifically, may include ethanol.

In addition, in the present disclosure, in the aging step, a mixed solution of an alkoxy silane-based compound and an alcohol may be added to provide an additional sol precursor source as well as unreacted sol to induce additional gelation in the silica gel network structure, thereby further strengthening the gel structure. At this time, the alkoxy silane-based compound may be included in an amount of 0.5 parts by weight to 9.5 parts by weight, 1.0 part by weight to 9.5 parts by weight, or 1.5 parts by weight to 9.5 parts by weight based on the total 100 parts of the aging solution.

In the present disclosure, the alkoxy silane-based compound may include one or more selected from the group consisting of tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, methyltrimethoxysilane (MTMS), methyltriethoxysilane (MTES), trimethylethoxysilane (TMES), trimethylsilanol (TMS), trimethylchlorosilane (TMCS), ethyltriethoxysilane (ETES), dimethyldiethoxysilane (DMDEOS), and phenyltriethoxysilane.

In addition, in the present disclosure, the alcohol may specifically be a monohydric alcohol such as methanol, ethanol, isopropanol, and butanol, or a polyhydric alcohol such as glycerol, ethylene glycol, propylene glycol, diethylene glycol, dipropylene glycol, and sorbitol, preferably a monohydric alcohol having 1 to 6 carbon atoms such as methanol, ethanol, isopropanol, and butanol, and may be, for example, ethanol, but is not limited thereto.

In the present disclosure, the aging step may be performed by leaving the wet gel composite which has gelled to stand at a temperature of 30° C. to 80° C., 40° C. to 80° C., or 50° C. to 80° C. for 0.1 hours to 20 hours, 0.5 hours to 15 hours, 0.5 hours to 10 hours, 0.5 hours to 7 hours, or 1 hour to 5 hours to strengthen the pore structure, and within this range, it is possible to prevent an increase in production costs by preventing a loss of the solvent due to evaporation while preventing a decrease in productivity.

In addition, in the present disclosure, the aging step may be performed by performing primary aging of leaving the wet gel composite which has gelled at 30° C. to 80° C. for 0.1 hours to 5 hours to strengthen the pore structure, and then performing secondary aging at 30° C. to 80° C. for 0.1 hours to 20 hours, 0.5 hours to hours, 0.5 hours to 10 hours, 0.5 hours to 7 hours, or 1 hour to 5 hours, by adding a solution in which the above-described basic catalyst is diluted in an organic solvent or a mixed solution of an alkoxy silane-based compound and an alcohol.

In the present disclosure, the aging step may be performed in a separate reaction vessel after recovering the wet gel composite which has gelled, or may be performed inside the reaction vessel in which the gelation step has been performed.

Surface Modification of Aged Wet Gel Composite

In the present disclosure, if necessary, a surface modification step of hydrophobizing the surface of the wet gel composite obtained by the gelation as described above or the surface of the aged wet gel composite may be further included in the presence of a surface modifier.

In the present disclosure, as the surface modifier, a compound which hydrophobizes the surface of a wet gel may be applied without limitation, which may be, for example, a silane-based compound, a siloxane-based compound, a silanol-based compound, a silazane-based compound, or a combination thereof. Specific examples thereof may be a silane-based compound such as trimethylchlorosilane (TMCS), dimethyldimethoxysilane, dimethyldiethoxysilane, methyltrimethoxysilane (MTMS), methyltriethoxysilane (MTES), trimethylethoxysilane (TMES), vinyltrimethoxysilane, ethyltriethoxysilane, phenyltriethoxysilane, phenyltrimethoxysilane, tetraethoxysilane, dimethyldichlorosilane, and 3-aminopropyltriethoxysilane, a siloxane-based compound such as polydimethyl siloxane, polydiethyl siloxane, and octamethyl cyclotetra siloxane, a silanol-based compound such as trimethylsilanol, triethylsilanol, triphenyl silanol, and t-butyldimethylsilanol, a silazane-based compound such as 1,2-diethyldisilazane, 1,1,2,2-tetramethyldisilazane, 1,1,3,3-tetramethyldisilazane, 1,1,1,2,2,2-hexamethyldisilazane (HMDS), 1,1,2,2-tetraethyldisilazane, and 1,2-diisopropyldisilazane, or a combination thereof, but are not limited thereto.

In the present disclosure, the surface modifier may be used in a solution phase diluted in an organic solvent. Here, the organic solvent may be an alcohol (an organic solvent), and at this time, the surface modifier may be diluted to 1 vol % to 15 vol % based on the total volume of the diluted solution.

In addition, in the present disclosure, the surface modifier may be added in an amount of 0.01 vol % to 90 vol % with respect to the wet gel composite for a sufficient surface modification effect, but is not limited thereto.

In the present disclosure, the surface modification step may be performed at a temperature of 50° C. to 90° C. or 50° C. to 80° C. for 1 hour to 24 hours, but is not limited thereto.

Drying Step

In the present disclosure, a drying step of drying the surface-modified wet gel composite to obtain an aerogel composite may be included.

In the present disclosure, the drying is performed as a process of removing only the solvent while maintaining the pore structure of the aged gel, and may be performed, for example, by supercritical drying or normal-pressure drying.

In the present disclosure, the supercritical drying process is performed using supercritical carbon dioxide, and for example, may be performed by placing the aged wet gel composite in a supercritical drying reactor, filling the reactor with $CO_2$ in a liquid state, performing a solvent replacement process of replacing an alcohol solvent inside the wet gel with $CO_2$, followed by raising the temperature to a temperature of 40° C. to 70° C. at a predetermined temperature increase rate, for example, a rate of 0.1° C./min to 1° C./min, and then maintaining a pressure equal to or higher than the pressure at which carbon dioxide becomes supercritical, for example, a pressure of 100 bar to 150 bar, thereby maintaining the supercritical state of carbon dioxide for a predetermined period of time, specifically, 20 minutes to 1 hour. In general, carbon dioxide becomes supercritical at a temperature of 31° C., and a pressure of 73.8 bar. After the predetermined temperature and the predetermined pressure at which carbon dioxide becomes supercritical are maintained for 2 hours to 12 hours, more specifically, 2 hours to 6 hours, the pressure is gradually removed to complete the supercritical drying process, thereby preparing an aerogel composite, but the present disclosure is not limited thereto.

In addition, in the present disclosure, the normal-pressure drying process may be performed according to a typical method such as hot air drying or IR drying at a temperature of 70° C. to 200° C. and under a normal pressure (1±0.3 atm), but is not limited thereto.

In addition to the above process, the present disclosure includes acidification of a basic metal oxide precursor (e.g., sodium silicate) in water to prepare a hydrogel. A salt by-product may be removed from a silicic acid precursor by ion exchange and/or subsequent washing of the formed gel with water. Removing the water from pores of the gel may be performed through exchange with a polar organic solvent, such as ethanol, methanol, or acetone. Subsequently, the liquid phase in the gel is at least partially extracted using innovative processing and extraction techniques.

In addition to the above process, the present disclosure includes reducing damage capillary force at a solvent/pore interface by chemical transformation of a matrix material in a wet gel state through conversion of a surface hydroxyl group to hydrophobic trimethylsilylether, thereby enabling liquid phase extraction from a gel material at a temperature and a pressure below the critical point of the solvent.

In addition to the above process, in the present disclosure, a liquid (solvent) in the gel material is frozen at a lower temperature and a sublimation process is subsequently performed, so that the solvent may be removed from the gel material. Such removal or drying of the solvent from the gel material is understood to be within the scope of the present disclosure. Such removal largely preserves the gel structure, resulting in producing an aerogel with unique properties.

The aerogel composite provided in the present disclosure may be usefully used as a heat insulation material, thermal insulation material, or non-combustible material for aircraft, ships, automobiles, electronic devices, and batteries, as well as for plant facilities for heat and cold insulation, such as piping or industrial furnaces of various industrial facilities.

In accordance with another aspect of the present disclosure, a heat insulation member includes the aerogel composite provided in the present disclosure. In the present disclosure, the heat insulation member may include the aerogel composite as described above, and a support member positioned on at least one surface of an upper surface of the aerogel composite and a lower surface thereof.

In the present disclosure, the support member may be, for example, a film-like support member, a sheet-like support member, a foil-like support member, a porous support member, and the like.

In the present disclosure, the film-like support member is formed by molding a polymer raw material into a thin film, and examples thereof may include an organic film of such as PET and polyimide, a glass film, and the like (including a metal-deposited film).

In the present disclosure, the sheet-like support member is formed by molding an organic, inorganic, or metallic fibrous raw material, and examples thereof may include paper, a non-woven fabric (including a glass mat), an organic fiber fabric, glass cloth, and the like.

In the present disclosure, the foil-like support member is formed by molding a metal raw material into a thin film, and examples thereof may include an aluminum foil, a copper foil, and the like.

In the present disclosure, the porous support member has a porous structure made of an organic, inorganic, or metal raw material, and examples thereof may include a porous organic material (e.g., polyurethane foam), a porous inorganic material (e.g., a zeolite sheet), a porous metal material (e.g., a porous metal sheet, a porous aluminum sheet), and the like.

In the present disclosure, the thickness of the support member is not particularly limited, and may be, for example, 0.1 μm to 100 μm, or 1 μm to 50 μm.

In the present disclosure, the heat insulation member may also be applied to applications such as a heat insulation material, thermal insulation material, or non-combustible material in the construction field, aviation field, automobile field, batteries, home appliances, semiconductor field, industrial facilities, and the like. Hereinafter, the present disclosure will be described in detail with reference to the following examples. However, the following examples are illustrative of the present disclosure, and the contents of the present disclosure are not limited by the following examples.

EXAMPLES

[Example 1] Preparation of Aerogel Composite

Methyltriethoxysilane (MTES) and tetraethyl orthosilicate (TEOS) were mixed in a molar ratio of 1:9 to prepare a silica precursor composition. The silica precursor composition and ethanol were mixed in a weight ratio of 1:1.8, and water having a molar ratio of 1:5 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:0.8. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 30 minutes. Thereafter, the wet gel composite which has gelled was added with 109% of a prepared tetraethylorthosilicate (TEOS) solution (solvent:ethanol) of 3.4 wt %, based on the volume of the wet gel composite and was subjected to secondary aging in an oven at 75° C. for 1 hour. The wet gel composite was added with 90 vol % of a solution (2 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.219 g/cc.

[Example 2] Preparation of Aerogel Composite

Methyltriethoxysilane (MTES) and tetraethyl orthosilicate (TEOS) were mixed in a molar ratio of 1:9 to prepare a silica precursor composition. The silica precursor composition and ethanol were mixed in a weight ratio of 1:1.3, and water having a molar ratio of 1:4 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 3 mm) was impregnated with the catalyzed sol at a volume ratio of 1:1, such that the weight ratio of the fiber:aerogel was to be 1:1. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 40° C. After the gelation was completed, stabilization was performed at room temperature (25° C.) for 10 minutes, and then primary aging was performed in an oven at 70° C. for 30 minutes. Thereafter, the wet gel composite which has gelled was added with 109% of a solution, which was prepared by diluting 2.9 wt % of methyltriethoxysilane (MTES) in ethanol with a water content of 10 wt %, based on the volume of the wet gel composite, and then was subjected to secondary aging in an oven at 75° C. for 2 hour. The wet gel composite was added with 90 vol % of a solution (2 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.242 g/cc.

[Example 3] Preparation of Aerogel Composite

Methyltriethoxysilane (MTES) and tetraethyl orthosilicate (TEOS) were mixed in a molar ratio of 1:9 to prepare a silica precursor composition. The silica precursor composition and ethanol were mixed in a weight ratio of 1:2.8, and water having a molar ratio of 1:5 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:0.6. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 40° C. After the gelation was completed, stabilization was performed at room temperature (25° C.) for 10 minutes, and then primary aging was performed in an oven at 70° C. for 30 minutes. Thereafter, the wet gel composite which has gelled was added with 109% of a solution, which was prepared by diluting 2.9 wt % of methyltriethoxysilane (MTES) in ethanol with a water content of 10 wt %, based on the volume of the wet gel composite, and then was subjected to secondary aging in an oven at 75° C. for 1 hour. The wet gel composite was added with 90 vol % of a solution (2 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.192 g/cc.

[Example 4] Preparation of Aerogel Composite

Methyltriethoxysilane (MTES) and tetraethyl orthosilicate (TEOS) were mixed in a molar ratio of 1:9 to prepare a silica precursor composition. The silica precursor composition and ethanol were mixed in a weight ratio of 1:1.3, and water having a molar ratio of 1:4 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:1. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 40° C. After the gelation was completed, stabilization was performed at room temperature (25° C.) for 10 minutes, and then primary aging was performed in an oven at 70° C. for 30 minutes. Thereafter, a mixture of ethanol and ammonia water (volume ratio of 98:2) was prepared and added to the wet gel composite which has gelled in an amount of 1.6 times the volume of the silica sol, and then secondary aging was performed in an oven at 70° C. for 5 hours. The wet gel composite was added with 90 vol % of a solution (2 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.241 g/cc.

[Example 5] Preparation of Aerogel Composite

Methyltriethoxysilane (MTES) and tetraethyl orthosilicate (TEOS) were mixed in a molar ratio of 1:9 to prepare a silica precursor composition. The silica precursor composition and ethanol were mixed in a weight ratio of 1:1.3, and water having a molar ratio of 1:4 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:1. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 30 minutes. Thereafter, a mixture of ethanol and ammonia water (volume ratio of 98:2) was prepared and added to the wet gel composite which has gelled in an amount of 1.6 times the volume of the silica sol, and then secondary aging was performed in an oven at 70° C. for 3 hours. The wet gel composite was added with 90 vol % of a solution (2 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.238 g/cc.

[Comparative Example 1] Preparation of Aerogel Composite

Tetraethyl orthosilicate (TEOS) and ethanol were mixed in a weight ratio of 1:0.5 and water having a molar ratio of 1:1 with respect to TEOS was added thereto to prepare a silica precursor solution. In order to promote hydrolysis of the silica precursor solution, an acid was added such that the pH of the silica precursor solution was to be 3 or less and then the mixture stirred for 2 hours or more to prepare a hydrated TEOS solution. Ethanol having a weight ratio of 1:0.8 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:0.8. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 25° C. The prepared wet gel composite was added with 109% of a solution as an aging solution, which was prepared by diluting 2.4 wt % of ammonium hydroxide ($NH_4OH$) in ethanol with a water content of 10 wt %, based on the volume of the wet gel composite, and was aged for 1 hour at a temperature of 75° C. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.210 g/cc.

[Comparative Example 2] Preparation of Aerogel Composite

Tetraethyl orthosilicate (TEOS) and ethanol were mixed in a weight ratio of 1:0.5 and water having a molar ratio of 1:1 with respect to TEOS was added thereto to prepare a silica precursor solution. In order to promote hydrolysis of the silica precursor solution, an acid was added such that the pH of the silica precursor solution was to be 3 or less and then the mixture stirred for 2 hours or more to prepare a hydrated TEOS solution. Ethanol having a weight ratio of 1:1.4 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:0.6. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 25° C. The prepared wet gel composite was added with 109% of a prepared tetraethylorthosilicate (TEOS) solution (solvent: ethanol) of 1.7 wt % as an aging solution based on the volume of the wet gel composite and was subjected to aging in an oven at 75° C. for 1 hour. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.192 g/cc.

[Comparative Example 3] Preparation of Aerogel Composite

Methyltriethoxysilane (MTES) and tetraethyl orthosilicate (TEOS) were mixed in a molar ratio of 1:9 to prepare a silica precursor composition. The silica precursor composition and ethanol were mixed in a weight ratio of 1:3.5, and water having a molar ratio of 1:5 with respect to the silica precursor composition was added thereto to prepare a silica sol. In order to facilitate hydrolysis, hydrochloric acid was added such that the pH of the silica sol was to be 3 or less and then the mixture was stirred for 6 hours or more. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) was impregnated with the catalyzed sol at a volume ratio of 1:1, such that the weight ratio of the fiber:aerogel was to be 1:0.5. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 25° C. The prepared silica wet gel composite was left to stand in an ethanol solution at a temperature of 70° C. for 1 hour to be aged. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.180 g/cc.

[Comparative Example 4] Preparation of Aerogel Composite

Tetraethyl orthosilicate (TEOS) and ethanol were mixed in a weight ratio of 1:0.5 and water having a molar ratio of 1:1 with respect to TEOS was added thereto to prepare a silica precursor solution. In order to promote hydrolysis of the silica precursor solution, an acid was added such that the pH of the silica precursor solution was to be 3 or less and then the mixture stirred for 2 hours or more to prepare a hydrated TEOS solution. Ethanol having a weight ratio of 1:0.45 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) as a substrate was impregnated with the catalyzed sol at a volume ratio of 1:1, such that the weight ratio of the fiber:aerogel was to be 1:1. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 25° C. The prepared wet gel composite was added with 90 vol % of a solution (2 vol %) as a surface modifier, which was prepared by diluting trimethylethoxysilane (TMES) in ethanol, based on the volume of the wet gel composite, and then was subjected to surface modification at a temperature of 75° C. for 12 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.244 g/cc.

[Comparative Example 5] Preparation of Aerogel Composite

Tetraethyl orthosilicate (TEOS) and ethanol were mixed in a weight ratio of 1:0.5 and water having a molar ratio of 1:1 with respect to TEOS was added thereto to prepare a silica precursor solution. In order to promote hydrolysis of the silica precursor solution, an acid was added such that the pH of the silica precursor solution was to be 3 or less and then the mixture stirred for 2 hours or more to prepare a hydrated TEOS solution. Ethanol having a weight ratio of 1:2.4 with respect to the hydrated TEOS solution was added to prepare a silica sol. A base catalyst solution (5 wt % of NaOH aqueous solution) having a volume ratio of 99:1 with respect to the silica sol was added to prepare a catalyzed sol. After filling the catalyzed sol in an impregnation tank, a fiber substrate (glass fiber mat, 5 mm) as a substrate was impregnated with the catalyzed sol at a volume ratio of 1:1, such that the weight ratio of the fiber:aerogel was to be 1:0.4. The fiber substrate which passed through the impregnation tank to allow the catalyzed sol to infiltrate thereinto was gelled for 10 minutes while moving on a conveyor belt at a predetermined rate. At this time, the ambient atmosphere temperature at the top of the conveyor belt was maintained at 35° C. After the gelation was completed, stabilization was performed at room temperature (25° C.) for 10 minutes, and then primary aging was performed in an oven at 70° C. for 30 minutes. Thereafter, a mixture of ethanol and ammonia water (volume ratio of 98:2) was prepared and added to the wet gel composite which has gelled in an amount of 1.6 times the volume of the silica sol, and then secondary aging was performed in an oven at 70° C. for 1 hours. The aged wet gel composite was added with 90 vol % of a hexamethyldisilazane (HMDS)/ethanol solution (volume ratio of 5:95) as a surface modifier based on the volume of the wet gel composite, and then was subjected to surface modification at a temperature of 75° C. for 4 hours. The silica wet gel was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, the ethanol was recovered through a lower end of the extractor. Thereafter, $CO_2$ was vented over the course of 2 hours, resulting in preparing a hydrophobic silica aerogel composite having a density of about 0.168 g/cc.

[Experimental Example 1] Analysis of Volume Ratio of Voids and Aerogel Including Pores in Aerogel Composite In order to analyze the volume ratio of the fibers alone and the volume ratio of the remaining portion other than the fibers, which includes the voids between discrete fibers and the aerogel including a plurality of pores, in the aerogel composites obtained in Examples 1 to 5 and in Comparative Examples 1 to 5. First, aerogel composites of Examples 1 to 5 and Comparative Examples 1 to 5 produced to have a width×length of approximately 60 cm×12 cm and a height of approximately 0.4 cm were prepared, and five rectangular parallelepiped specimens having a size of width×length of 1 cm×1 cm were obtained from each of the aerogel composites. However, at this time, the five specimens were obtained by obtaining four specimens by positioning a position, which is spaced apart by 10 cm in a center direction from each corner of the aerogel composite, and obtaining one specimen by positioning the exact central portion of the aerogel composite at the exact center of a specimen.

Thereafter, the specimen is placed in a load cell by DEBEN Co., followed by assembling the load cell, and a stage portion of the device was changed to a dedicated stage capable of fixing the load cell. First, in-situ XRM analysis was performed using the VERSA 520 equipment of ZEISS Co., under the conditions shown in Table 1 below without applying pressure. Upon the completion of the above-described analysis, pressure was applied with respect to the aerogel composite, and then in order to confirm the change in the volume ratio of the aerogel including a plurality of pores and the voids between discrete fibers, where the aerogel particles are not occupied, Microtest software by DEBEN Co. was activated and then the in-situ XRM analysis was performed by setting 150 N/cm² or 300 N/cm² as the constant load.

TABLE 1

| Acceleration voltage | 80 kV |
|---|---|
| Voxel size | 2.5 μm |
| Magnification of objective lens | 4X |
| Exposure time | 1 s/frame |
| Number of total frames | 3201 |

Figure 2:
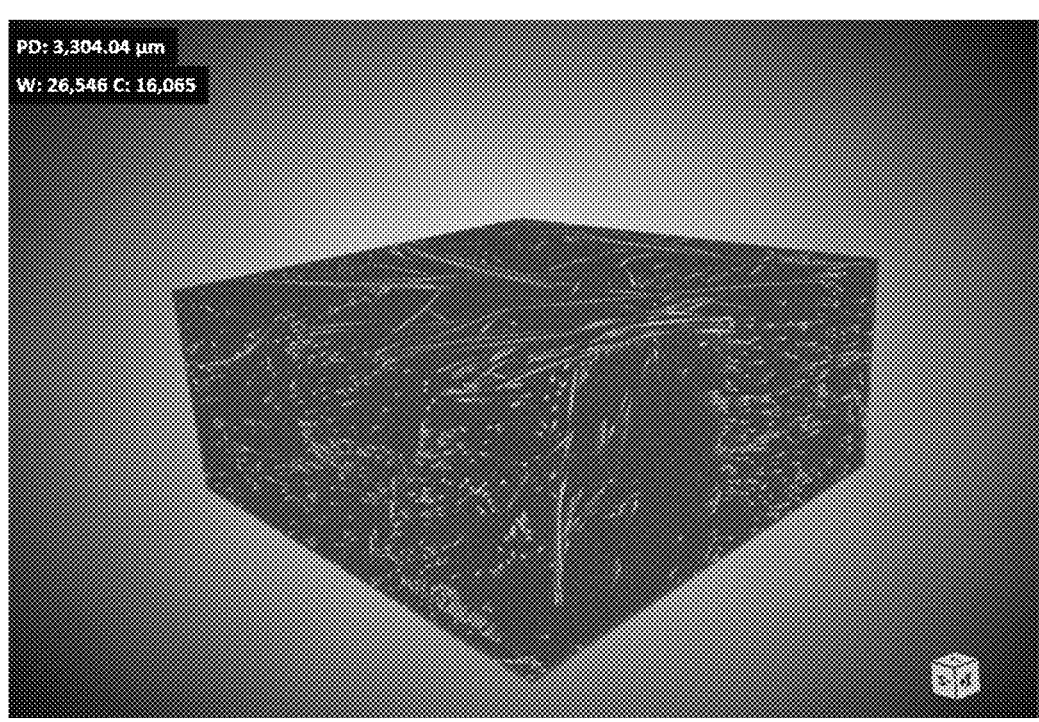
FIG. 2 illustrates an example process of distinguishing fibers and the remaining portion other than the fibers in the segmented region by contrast level using Dragonfly software.
Figure 3:
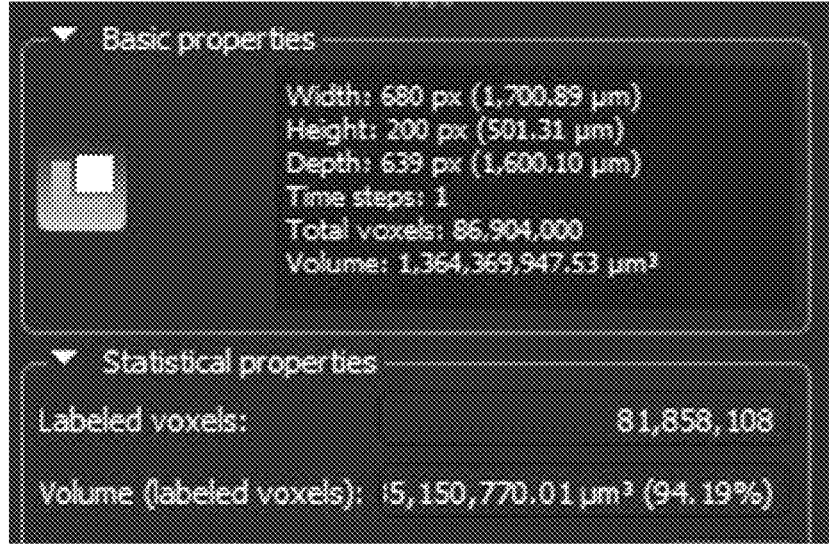
FIG. 3 illustrates an example process of calculating the volume occupancy ratio (volume ratio) of each of the fibers and the remaining portion other than the fibers using Dragonfly software.

In order to confirm the volume ratio of the fiber, the voids, and the aerogel including pores in each of the aerogel composite specimens based on the results of the analysis, Dragonfly software (version 2021.3) used. In order to facilitate understanding, the analysis method will be explained as follows with reference to FIGS. 1 to 3 showing one example process of the analysis. After activating the results of the in-situ XRM analysis with the Dragonfly software, a region to be segmented was set and extracted by adjusting the border through the Clip function (FIG. 1). At this time, the size of the segmentation region was set to be about 1700 μm×1600 μm×500 μm (width×depth×height). Within the segmented region, the fibers and the remaining portion other than the fibers were distinguished, based on contrast level, using a lower otsu function and an upper otsu function of the Dragonfly software (FIG. 2). The lower otsu function identified portions of the segmented region with lower contrast, corresponding to the portion other than the fibers, and the upper otsu function identified portions of the segmented region with higher contrast, corresponding to the fibers. The volume occupancy ratio (volume ratio) of the fibers and of the remaining portion other than the fibers was then calculated using the Dragonfly software (FIG. 3). Through the above-described analysis, the volume ratio of the fibers and the volume ratio of the remaining portion other than fibers (i.e., the portions occupied by voids between discrete fibers and aerogel including pores) per unit volume of the aerogel composite without compression and after compression with a pressure intensity of 150 N/cm$^2$ or 300 N/cm$^2$ were measured for the five specimens of each Example or Comparative Example. After then, the average value of the volume ratios for the five specimens of each Example or Comparative Example was calculated, and shown in Tables 2 to 4 below. In addition, in order to confirm the change in the volume ratio of the aerogel including pores and the voids according to the compression, the rate of change in the volume ratio of the aerogel including pores and the voids after the compression with respect to the volume ratio thereof without compression was calculated, and the results are shown in Table 5 below.

TABLE 2

| | No compression | |
|---|---|---|
| Classification | Volume ratio of voids between fibers + aerogel including pores (%) (C) | Volume ratio of fibers (%) |
| Example 1 | 91.6 | 8.4 |
| Example 2 | 92.52 | 7.48 |
| Example 3 | 90.13 | 9.87 |
| Example 4 | 93.68 | 6.32 |
| Example 5 | 95.27 | 4.73 |
| Comparative Example 1 | 91.24 | 8.76 |
| Comparative Example 2 | 90.18 | 9.82 |
| Comparative Example 3 | 88.65 | 11.35 |
| Comparative Example 4 | 93.02 | 6.98 |
| Comparative Example 5 | 85.47 | 14.53 |

TABLE 3

| | 150 N/cm$^2$ compression | |
|---|---|---|
| Classification | Volume ratio of voids between fibers + aerogel including pores (%) (D) | Volume ratio of fibers (%) |
| Example 1 | 80.08 | 19.92 |
| Example 2 | 87.03 | 12.97 |
| Example 3 | 86.52 | 13.48 |
| Example 4 | 83.45 | 16.55 |
| Example 5 | 85.81 | 14.19 |
| Comparative Example 1 | 75.03 | 24.97 |
| Comparative Example 2 | 73.56 | 26.44 |
| Comparative Example 3 | 70.3 | 29.7 |

TABLE 3-continued

| | 150 N/cm$^2$ compression | |
|---|---|---|
| Classification | Volume ratio of voids between fibers + aerogel including pores (%) (D) | Volume ratio of fibers (%) |
| Comparative Example 4 | 69.92 | 30.08 |
| Comparative Example 5 | 70.46 | 29.54 |

TABLE 4

| | 300 N/cm$^2$ compression | |
|---|---|---|
| Classification | Volume ratio of voids between fibers + aerogel including pores (%) (E) | Volume ratio of fibers (%) |
| Example 1 | 78.04 | 21.96 |
| Example 2 | 84.71 | 15.29 |
| Example 3 | 81.04 | 18.96 |
| Example 4 | 77.19 | 22.81 |
| Example 5 | 76.9 | 23.1 |
| Comparative Example 1 | 71.01 | 28.99 |
| Comparative Example 2 | 68.7 | 31.3 |
| Comparative Example 3 | 62.56 | 37.44 |
| Comparative Example 4 | 64.38 | 35.62 |
| Comparative Example 5 | 63.81 | 36.19 |

TABLE 5

| | Rate of change in volume ratio (times) | |
|---|---|---|
| Classification | 150N/0N | 300N/0N |
| Example 1 | 0.874236 | 0.851965 |
| Example 2 | 0.940661 | 0.915586 |
| Example 3 | 0.959947 | 0.899146 |
| Example 4 | 0.890798 | 0.823975 |
| Example 5 | 0.900703 | 0.80718 |
| Comparative Example 1 | 0.822337 | 0.778277 |
| Comparative Example 2 | 0.815702 | 0.76181 |
| Comparative Example 3 | 0.793006 | 0.705697 |
| Comparative Example 4 | 0.751666 | 0.692109 |
| Comparative Example 5 | 0.824383 | 0.746578 |

As shown in Table 2 to 5, compared to the aerogel composites of Comparative Examples 1 to 5, the aerogel composites (Examples 1 to 5) according to the present disclosure has a high volume ratio of voids between discrete fibers and aerogel including pores per unit volume of the aerogel composite, wherein the aerogel including pores has excellent strength, and thus, even when compressed with a high pressure of 150 N/cm$^2$ or greater, the degree of change in the volume ratio is small, and specifically, it has been confirmed that the volume ratio is maintained at 0.85 times or more the volume ratio before the compression.

[Experimental Example 2] Analysis of Heat Transmission Coefficient after Compression of Aerogel Composite Specimens each having a size of width×length of 30 cm×24 cm were prepared respectively using the aerogel composites obtained in Examples 1 to 5 and Comparative Examples 1 to 5, and then compressed for 10 minutes under respective pressure conditions using QM900A-15T press equipment of QMESYS Co. Before the compression and 1 hour after the completion of the compression, the thickness and thermal conductivity of the aerogel composites were measured using HFM436 equipment of Netzsch Co. to calculate the heat transmission coefficient. In addition, in order to confirm the change in heat transmission coefficient before and after the compression, the ratio of the heat transmission coefficient after compression with an intensity of 150 N/cm$^2$ or 300 N/cm$^2$ with respect to the heat transmission coefficient before the compression was calculated, and the results are shown in Table 6 below. In addition, in order to confirm the degree of change in the heat transmission coefficient before and after the compression, an average value (b) of heat transmission coefficients measured after performing compression with an intensity of no compression (0 N/cm$^2$), 150 N/cm$^2$, and 300 N/cm$^2$ was calculated, and as shown in Equation 2 below, the difference between the heat transmission coefficient (a) measured after performing compression with no compression, or a pressure of each of 150 N/cm$^2$ and 300 N/cm$^2$ and the average value (b) of the heat transmission coefficients, and A, which is a value obtained by dividing the difference by the average value (b) of the heat transmission coefficients, were calculated, and the results are shown in Table 7. Pressure values shown in Tables 6 and 7 below are values of pressure applied per unit area of a specimen, and refers to a value obtained by multiplying the area of a cylinder of the press equipment by a set pressure value and dividing the product by the area of the specimen as shown in Equation 1 below. The cylinder radius of the QM900A-15T press equipment used in the present experiment is 6.25 cm, and the cylinder size is 12.5 cm. In addition, in Tables below, each result value was rounded from the third decimal place and expressed to two decimal places.

Actual pressure value = [Equation 1]

(Radius of inner diameter of cylinder of press equipment × Radius of inner diameter of cylinder of press equipment × 3.14 × set pressure value)/

(Area of speciment

{(Heat transmission coefficient ($a$) before [Equation 2]

and after compression − Average value ($b$) of heat transmission coefficients before and after compression)} =

(Average value ($b$) of heat transmission coefficients before and after compression) × $A$

TABLE 6

| Classification | Heat transmission coefficient (W/m$^2$K) | | | Rate of change in heat transmission coefficient (times) | |
|---|---|---|---|---|---|
| | 0 | 150 N/cm$^2$ | 300 N/cm$^2$ | 150N/0N | 300N/0N |
| Example 1 | 6.52 | 8.02 | 8.66 | 1.23 | 1.33 |
| Example 2 | 3.31 | 3.75 | 4.15 | 1.13 | 1.25 |
| Example 3 | 5.23 | 5.67 | 6.27 | 1.08 | 1.20 |
| Example 4 | 4.68 | 5.91 | 7.13 | 1.26 | 1.52 |
| Example 5 | 3.22 | 3.95 | 4.96 | 1.23 | 1.54 |
| Comparative Example 1 | 6.27 | 11.78 | 13.73 | 1.88 | 2.19 |
| Comparative Example 2 | 6.04 | 11.57 | 13.59 | 1.92 | 2.25 |
| Comparative Example 3 | 7.42 | 13.52 | 17.88 | 1.82 | 2.41 |
| Comparative Example 4 | 4.26 | 9.64 | 16.39 | 2.26 | 3.85 |
| Comparative Example 5 | 7.81 | 15.06 | 21.31 | 1.93 | 2.73 |

TABLE 7

| Classification | Pressure conditions | Heat transmission coefficient before and after compression (a) (W/m$^2$K) | Average value of heat transmission coefficients before and after compression (b) (W/m$^2$K) | Deviation of heat transmission coefficients before and after compression (a − b) (W/m$^2$K) | Deviation of heat transmission coefficients before and after compression/average value of heat transmission coefficients (a − b/b = A) |
|---|---|---|---|---|---|
| Example 1 | 0 | 6.52 | 7.73 | −1.21 | −0.16 |
| | 150 N/cm$^2$ | 8.02 | | 0.29 | 0.04 |
| | 300 N/cm$^2$ | 8.66 | | 0.93 | 0.12 |
| Example 2 | 0 | 3.31 | 3.74 | −0.43 | −0.11 |
| | 150 N/cm$^2$ | 3.75 | | 0.01 | 0.00 |
| | 300 N/cm$^2$ | 4.15 | | 0.41 | 0.11 |
| Example 3 | 0 | 5.23 | 5.72 | −0.49 | −0.09 |
| | 150 N/cm$^2$ | 5.67 | | −0.05 | −0.01 |
| | 300 N/cm$^2$ | 6.27 | | 0.55 | 0.10 |
| Example 4 | 0 | 4.68 | 5.91 | −1.23 | −0.21 |
| | 150 N/cm$^2$ | 5.91 | | 0.00 | 0.00 |
| | 300 N/cm$^2$ | 7.13 | | 1.22 | 0.21 |
| Example 5 | 0 | 3.22 | 4.04 | −0.82 | −0.20 |
| | 150 N/cm$^2$ | 3.95 | | −0.09 | −0.02 |
| | 300 N/cm$^2$ | 4.96 | | 0.92 | 0.23 |

TABLE 7-continued

| Classification | Pressure conditions | Heat transmission coefficient before and after compression (a) (W/m$^2$K) | Average value of heat transmission coefficients before and after compression (b) (W/m$^2$K) | Deviation of heat transmission coefficients before and after compression (a − b) (W/m$^2$K) | Deviation of heat transmission coefficients before and after compression/average value of heat transmission coefficients (a − b/b = A) |
|---|---|---|---|---|---|
| Comparative | 0 | 6.27 | 10.59 | −4.32 | −0.41 |
| Example 1 | 150 N/cm$^2$ | 11.78 | | 1.19 | 0.11 |
| | 300 N/cm$^2$ | 13.73 | | 3.14 | 0.30 |
| Comparative | 0 | 6.04 | 10.40 | −4.36 | −0.42 |
| Example 2 | 150 N/cm$^2$ | 11.57 | | 1.17 | 0.11 |
| | 300 N/cm$^2$ | 13.59 | | 3.19 | 0.31 |
| Comparative | 0 | 7.42 | 12.94 | −5.52 | −0.43 |
| Example 3 | 150 N/cm$^2$ | 13.52 | | 0.58 | 0.04 |
| | 300 N/cm$^2$ | 17.88 | | 4.94 | 0.38 |
| Comparative | 0 | 4.26 | 10.10 | −5.84 | −0.58 |
| Example 4 | 150 N/cm$^2$ | 9.64 | | −0.46 | −0.05 |
| | 300 N/cm$^2$ | 16.39 | | 6.29 | 0.62 |
| Comparative | 0 | 7.81 | 14.73 | −6.92 | −0.47 |
| Example 5 | 150 N/cm$^2$ | 15.06 | | 0.33 | 0.02 |
| | 300 N/cm$^2$ | 21.31 | | 6.58 | 0.45 |

As shown in Tables 6 to 7 above, compared to the aerogel composites of Comparative Examples 1 to 5, the aerogel composites of Examples 1 to 5 according to the present disclosure were confirmed to have a small degree of increase in heat transmission coefficient of the aerogel composite even after compressed with an intensity of 150 N/cm$^2$ or greater compared to the heat transmission coefficient before the compression, a small degree of change in heat transmission coefficient even when compressed with a pressure of various pressure values of a low pressure to a high pressure, and maintains heat insulation performance at an excellent level.

[Reference Experimental Example 1] Analysis of Recovery Rate after Compression of Aerogel Composite In Experimental Example 2, when measuring the heat transmission coefficient after compression with respect to the aerogel composite of each of Examples and Comparative Examples, the thickness of the aerogel composite was measured using HFM436 equipment manufactured by Netzsch Co. before the compression and 1 hour after the completion of the compression under each pressure condition, and the compression recovery rate was calculated according to Equation 4 below, and the results are shown in Table 8 below.

$$\text{Compression recovery rate (\%)} = \quad \text{[Equation 4]}$$

$$\{(\text{Cross−sectional thickness of aerogel composite}$$

$$\text{after compression})/(\text{Cross−sectional thickness}$$

$$\text{of aerogel composite before compression})\} \times 100$$

TABLE 8

| Classification | Pressure conditions | Thickness recovery rate after compression (%) |
|---|---|---|
| Example 1 | 0 | — |
| | 150 N/cm$^2$ | 81.29% |
| | 300 N/cm$^2$ | 78.56% |
| Example 2 | 0 | — |
| | 150 N/cm$^2$ | 76.20% |
| | 300 N/cm$^2$ | 74.51% |
| Comparative | 0 | — |
| Example 1 | 150 N/cm$^2$ | 74.84% |
| | 300 N/cm$^2$ | 70.96% |
| Comparative | 0 | — |
| Example 4 | 150 N/cm$^2$ | 62.51% |
| | 300 N/cm$^2$ | 58.47% |

From the above results, it can be seen that it is difficult to say that the change in thickness of the aerogel composite before and after compression shows the same tendency as the change in volume ratio of the aerogel including pores and the voids in the aerogel composite before and after compression, or the change in heat transmission coefficient.

From the results as described above, it has been confirmed that the aerogel composite of the present disclosure has a high volume ratio of aerogel including a plurality of pores and voids between discrete fibers, wherein the voids substantially produce a heat insulation effect and the aerogel pores have excellent strength, and thus, is prevented from sharp degradation in heat insulation performance caused by pore destruction even when compressed under a high pressure, and maintains excellent heat insulation performance even after the compression.

When applied as a heat insulation material for batteries, electronic devices, automobiles, industrial devices, structures, or the like, an aerogel composite provided in the present disclosure may maintain an excellent level of heat insulation properties without significant degradation even when compressed and deformed by a pressure applied to the aerogel composite due to expansion of various devices or structures positioned adjacent thereto, or other causes.

What is claimed is:

1. An aerogel composite comprising:

a substrate including a plurality of discrete fibers and voids between the fibers; and silica aerogel including a plurality of aerogel particles positioned on the fiber and in the voids between the fibers, and having a network structure including one or more pores, wherein the volume ratio of the aerogel including pores and the voids per unit volume of the aerogel composite is 88% to 98%, wherein a total volume ratio of the fibers per unit volume of the aerogel composite is from 2% to 12%, wherein when a pressure of 150 N/cm$^2$ is applied in a thickness direction with respect to the aerogel composite, a volume ratio of aerogel including pores and voids between discrete fibers per unit volume of the aerogel composite is 0.85 times to 1 time compared to before the pressure was applied, wherein when a pressure of 300 N/cm$^2$ is applied in a thickness direction with respect to the aerogel composite, the volume ratio of the aerogel including pores and the voids per unit volume of the aerogel composite is 0.80 times to 1 time compared to before the pressure was applied, wherein when a pressure of 150 N/cm$^2$ is applied to a cross-section of the aerogel composite, the heat transmission coefficient after the compression is greater than 1 time and less than or equal to 1.5 times the heat transmission coefficient before the compression, wherein when a pressure of 300 N/cm$^2$ is applied to a cross-section of the aerogel composite, the heat transmission coefficient after the compression is greater than 1 time and less than or equal to 1.8 times the heat transmission coefficient before the compression.

2. The aerogel composite of claim 1, wherein when a pressure of 300 N/cm$^2$ is applied in the thickness direction with respect to the aerogel composite, the volume ratio of the aerogel including pores and the voids per unit volume of the aerogel composite is 0.89 times to 1 time the volume ratio thereof when a pressure of 150 N/cm$^2$ is applied.

3. The aerogel composite of claim 1, wherein when each of a pressure of 150 N/cm$^2$ and a pressure of 300 N/cm$^2$ are applied to the aerogel composite to compress the aerogel composite, the heat transmission coefficient before and after the compression satisfy Equation 2 below:

$$\{(\text{Heat transmission coefficient } (a) \text{ before} \qquad \text{[Equation 2]}$$
$$\text{and after compression} - \text{Average value } (b) \text{ of heat}$$

-continued
$$\text{transmission coefficients before and after compression}\} =$$

$$(\text{Average value } (b) \text{ of heat transmission}$$

$$\text{coefficients before and after compression}) \times A$$

wherein in Equation 2, the heat transmission coefficient (a) before and after compression refers to a heat transmission coefficient obtained after compression with an intensity of 0 N/cm$^2$, 150 N/cm$^2$, or 300 N/cm$^2$ in the thickness direction of the aerogel composite; the average value (b) of heat transmission coefficients before and after compression refers to an average value of the heat transmission coefficient of an unpressurized aerogel composite and heat transmission coefficients obtained after compressing the aerogel composite with an intensity of each of 150 N/cm$^2$ and 300 N/cm$^2$; and the A is a real number of −0.30 to +0.30.

4. The aerogel composite of claim 3, wherein the A is a real number of −0.25 to +0.25.

5. The aerogel composite of claim 1, wherein when each of a pressure of 150 N/cm$^2$ or 300 N/cm$^2$ is applied to the aerogel composite, a rate of change (B) in heat transmission coefficient after compression per unit applied pressure obtained after the compression satisfies Equation 3 below:

$$B = |(\text{heat transmission coefficient after compression} \qquad \text{[Equation 3]}$$
$$\text{with a pressure of } x - \text{heat transmission coefficient}$$
$$\text{after compression with a pressure of } y)/(x - y)|$$

wherein in Equation 3 above, x is a pressure intensity of 150 N/cm$^2$ or 300 N/cm$^2$, y is 0, and the B is a real number of 0 to 2.0×10$^{-2}$.

6. The aerogel composite of claim 5, wherein the x is 150 N/cm$^2$, y is 0, and the B is a real number of 0 to 1.5×10$^{-2}$.

7. The aerogel composite of claim 5, wherein the x is 300 N/cm$^2$, y is 0, and the B is a real number of 0 to 1.0×10$^{-2}$.

8. The aerogel composite of claim 1, wherein the fiber substrate and the aerogel in the aerogel composite are included at a weight ratio of 1:0.4 to 2.

9. The aerogel composite of claim 1, wherein a density of the aerogel composite is 0.15 g/cm$^3$ to 0.35 g/cm$^3$.

10. A heat insulation member comprising the aerogel composite of claim 1.

11. The aerogel composite of claim 10, wherein the heat insulation member further comprises a support member positioned on at least one surface of an upper surface of the aerogel composite and a lower surface thereof.

* * * * *